(12) United States Patent
Bickerton et al.

(10) Patent No.: US 6,684,384 B1
(45) Date of Patent: Jan. 27, 2004

(54) EXTENSIBLE OBJECT ORIENTED FRAMEWORK FOR GENERAL LEDGER

(75) Inventors: Matthew John Bickerton, Stratford (GB); Kathryn Ann Bohrer, Austin, TX (US); Emma Suzanne Hughes, Dudley (GB); Edward William Kenworthy, Stratford upon Avon (GB); Rupert Jeremy Musgrove, Alcester (GB); LindaMay Rose Patterson, Rochester, MN (US); Steven Porter, Shaw (GB); David Dennis Salt, Prestbury (GB); Duncan Keith Scattergood, Boughton Hackett (GB)

(73) Assignee: International Business Machines Corporation, Armonk, NY (US)

( * ) Notice: Subject to any disclaimer, the term of this patent is extended or adjusted under 35 U.S.C. 154(b) by 1164 days.

(21) Appl. No.: 08/827,285

(22) Filed: Mar. 28, 1997

(Under 37 CFR 1.47)

(51) Int. Cl.[7] ............................................. G06F 17/60

(52) U.S. Cl. ............................. 717/108; 705/30; 705/1

(58) Field of Search ................................ 705/1, 30, 38; 395/701, 704; 707/10, 6; 717/108

(56) References Cited

U.S. PATENT DOCUMENTS

| | | | | |
|---|---|---|---|---|
| 4,774,664 A | * | 9/1988 | Campbell et al. | 705/38 |
| 5,117,356 A | * | 5/1992 | Marks | 705/30 |
| 5,659,735 A | * | 8/1997 | Parrish et al. | 707/10 |
| 5,754,858 A | * | 5/1998 | Broman et al. | 395/701 |
| 5,774,725 A | * | 6/1998 | Yadav et al. | 395/704 |
| 5,787,425 A | * | 7/1998 | Bigus | 707/6 |
| 5,799,286 A | * | 8/1998 | Morgan et al. | 705/30 |

OTHER PUBLICATIONS

Natori et al., "Developing Object–oriented Frameworks Based on Data–Oriented Approach ad Use Cases," Journal of Information Processing Soc. of Japan, vol. 38, No. 3 (1997), pp. 634–656.

"Outline Report of Products: MSA series," Nikkei Data–pro–soft vol. 2 Data–pro–soft vol. 2 (1989), pp. 501–504.

Integrated Business System for Multi–Language and Multi–Currency [A.S.I.A.], Nikkei Computer Sep. 2, 1996 (No. 399), pp 26–27.

"Business Package Software for Small and Medium Sized Enterprises," Nikkei Pasocom Dec. 5, 1994, pp. 204–235.

Nakajima et al., "Formal Specification Technique for Design and Validation of Object–Oriented Frameworks," Proc of '95 Symp. Of IPSJ, 1995, pp. 213–220.

"Business Practice of Accounting System Design," Chyuoh–keizaisha, 1992, pp. 21–51, pp. 223–226.

* cited by examiner

Primary Examiner—Matthew Smithers
(74) Attorney, Agent, or Firm—Martin & Associates, LLC; Derek P. Martin

(57) ABSTRACT

An object oriented framework provides a set of objects that perform general ledger functioning and permits a framework user to add extensions to the framework for specific processing features, thereby producing a general ledger application program for managing business financial data of a company. The framework includes an Application category of classes that contains company information for general ledger processing, a Posting Combinations category of classes that define valid posting combinations for the general ledger, a Journals category of classes that create, process, validate, and post general ledger journals, a Bank Transactions category of classes that process bank statements, a Bank Statements and Reconciliation category of classes that reconcile bank statements with bank accounts, and a Closing category of classes that validate and close the current accounting period. These classes provide the base framework upon which a general ledger application program is developed by the framework user.

35 Claims, 20 Drawing Sheets

EXTENSIBLE OBJECT ORIENTED FRAMEWORK FOR GENERAL LEDGER

BACKGROUND OF THE INVENTION

1. Field of the Invention

This invention relates generally to data processing systems and, more particularly, to object oriented programming systems and processes.

2. Description of the Related Art

Computer programs have typically been developed using procedural programming techniques. Procedural programming techniques emphasize structuring the data processing procedures to which data values are subjected. Efforts to reduce long software development times and high software maintenance costs have resulted in structured programming techniques that attempt to reuse blocks of programming code. For example, tasks or processes that must be repeated can be written as system programming routines or program library functions. Program developers then provide an application program to accomplish a desired result using calls to the system routines and library functions.

System routines and library functions provide only a limited reduction in software development time and maintenance costs. Once a procedural application program is written, it is relatively difficult to incorporate new feature or additional data types. There are many processes in an application program that cannot be easily extracted from program code and reused. Additional data types often cannot be inserted into procedural program code without extensive rewriting of the original program code. Thus, even if new features in a program can be implemented using processes similar to those already in the application, the programming for such processes must be largely duplicated, with slight modifications, to provide the new features. This increases program development time. Moreover, if such programs must operate with other applications, it can be difficult to ensure that the changes will interface properly.

Another problem confronting program developers is that of providing program versions capable of operating with the various platforms used by customers. The different platforms encompass different operating systems as well as different companion applications with which the application must interface. With respect to operating systems, for example, a program developer might have to write different versions for satisfactory operation under the "Windows 95" operating system by Microsoft Corp., the UNIX system, the "MacIntosh" operating system by Apple Computer Corp., or the "OS/2" operating system by International Business Machines Corporation (IBM Corporation). In a similar fashion, a program developer might want to provide the ability to interface with application programs such as word processor programs, spreadsheet programs, and the like, meaning that the program developer must provide the ability to accept files (and produce files) in different file formats. Different platforms use different data formats and procedural operations, so program developers must provide different program versions or routines for each platform.

Object oriented programming (OOP) techniques encapsulate, or bind together, data and the methods that operate on them. This permits program development to more closely model real-world systems for problem solution and breaks up program development efforts into smaller, more manageable pieces. OOP programs are developed around object classes that have attributes, also called data values, and methods, also called functions. Although OOP techniques have done much to improve program development efficiency, such techniques still require a great degree of code generation on the part of application developers and limit program reuse among different classes.

OOP frameworks have been developed in an effort to further reduce program development costs. A framework is a set of OOP classes that embodies a predetermined set of attributes and methods for providing a common group of behaviors. An application program developer utilizes the framework and builds upon it, adding subclasses and attributes and modifying methods depending on the problem to be solved. Such changes to the framework are typically referred to as framework extensions, and are made possible by the OOP notions of inheritance and polymorphism. The challenge confronting framework developers, then, is to arrive at a set of classes and methods that will best provide the desired problem solution and will accept the most likely framework extensions. Thus, the designer of a framework must carefully assess what framework users will most likely need in the way of classes and attributes.

From the discussion above, it should be apparent that there is a need for an application program development tool that permits application program developers to more quickly develop and more easily maintain business financial applications such as general ledger software. The present invention fulfills this need.

SUMMARY OF THE INVENTION

In accordance with the present invention, a reusable object oriented (OO) framework for use with object oriented programming systems comprises a general ledger shell that provides a framework user with a set of general ledger classes that can perform general ledger functioning and permits the framework user to add extensions to the framework for specific processing features, thereby producing a general ledger application program for managing business financial data of a company. In this way, the general ledger framework provides a base set of classes on which program developers can build additional specific features they deem important. The framework includes classes for which it is anticipated extension subclassing with new attributes and methods will occur. An application program developer can customize the extension classes to meet the needs of application users and create all user interfaces with the application program, permitting the developer to more quickly conclude program development. The end-user interface establishes a means for the end-user to communicate with the application program to receive, process, and report data. The framework frees the program developer to concentrate on application program features, which can easily be implemented by extending the OO classes and methods of the OO framework. The general ledger framework thereby provides a base from which a variety of general ledger application programs can be quickly and efficiently produced.

The object oriented framework can be described in terms of object class categories of a General Ledger (GL) framework including a GL Application category of classes that contains company information for general ledger processing, a GL Posting Combinations category of classes that define valid posting combinations for the general ledger, a GL Journals category of classes that create, process, validate, and post GL journals, a GL Bank Accounts category of classes that defines internal and external bank accounts that are used in the general ledger, a GL Bank Transactions category of classes that process bank statements, a GL Bank Statements and Reconciliation category of classes that reconcile bank statements with GL Bank Accounts, and a GL Closing category of classes that validate and close the current accounting period. These classes provide the base framework upon which a general ledger application program is developed by the framework user.

Additional object categories include: GL Batches, which comprises classes of objects that create and maintain a batch of journals to be processed together; GL Budgets, which establishes a budget to be followed and reported against; GL Tax, to contain tax information associated with business transactions; GL Balances, for retrieving account balances for dissection; GL Revaluation, to convert account balances to and from various currencies; and GL Spread Profiles, which spreads the impact of a GL Journal across multiple accounting periods.

Other features and advantages of the present invention should be apparent from the following description of the preferred embodiment, which illustrates, by way of example, the principles of the invention.

DESCRIPTION OF THE PREFERRED EMBODIMENT

1. Application Program Development

Figure 1:
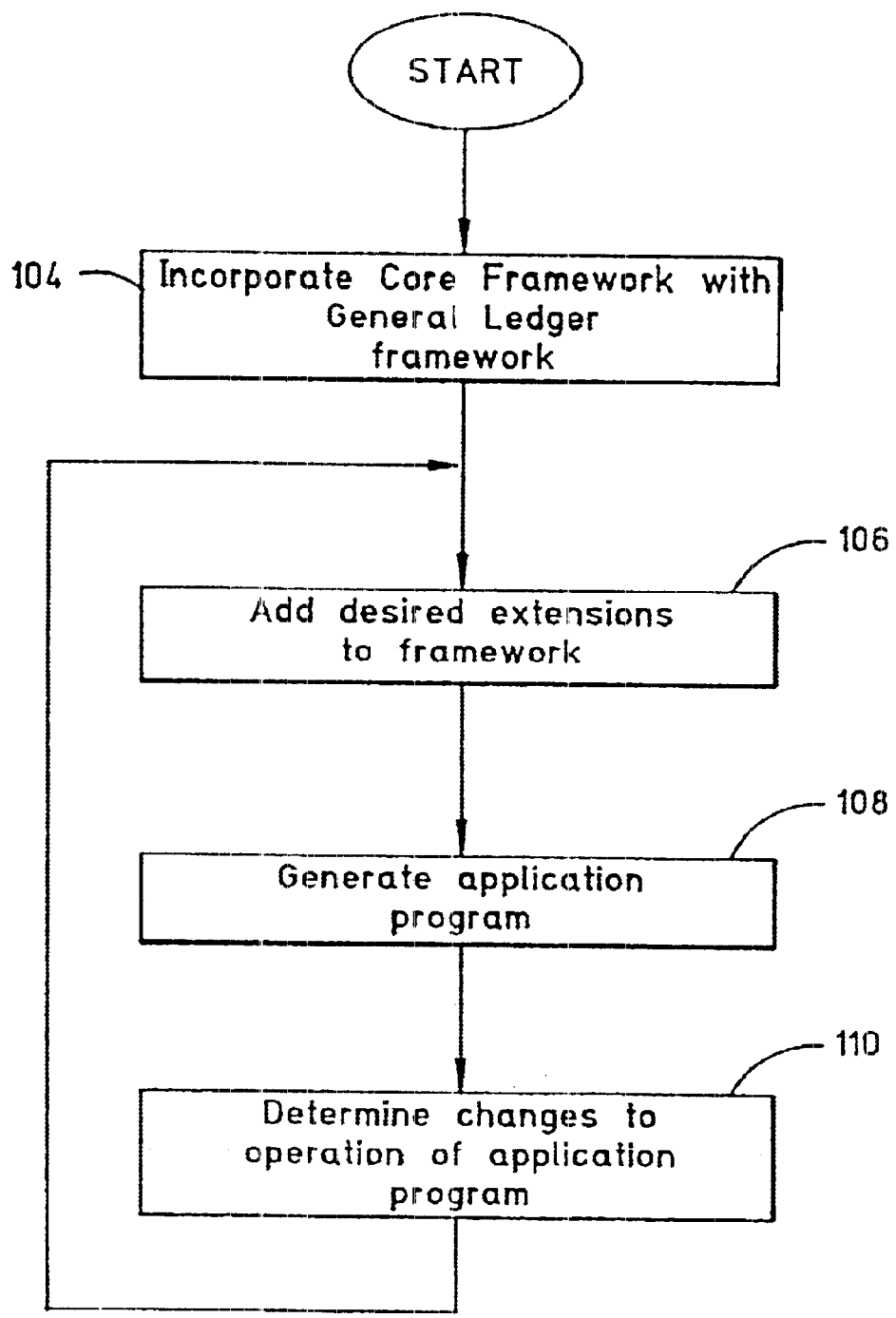
FIG. 1 is a flow diagram representation of the application development process that users of the framework will follow to provide a general ledger application program.

FIG. 1 is a flow diagram representation of the steps performed with a computer system to produce a general ledger business financials application program using the framework of the present invention. The general ledger program of the preferred embodiment is designed to obtain certain information from objects of related core classes. Such information will include business information concerning the company for which the accounting is to be performed, as well as other information needed to carry out operating in a computer system. These core classes can be organized into a core framework (CF) that is complementary to the framework of the present invention. The application developer provides a user interface and combines operating interface features of the core object classes with the structure and functionality of the General Ledger OOP framework constructed in accordance with the present invention, and also adds particular framework extensions as needed, to generate an application program. The resulting application program can be used by customers, such as accounting firms or businesses, to carry out general ledger functions and other tasks in the business financials domain. In the following description, "framework" will refer to the framework illustrated in the drawing figures and "application" will refer to an application program that comprises an implementation of the extended framework, produced by an application developer who uses the framework.

In the FIG. 1 flow diagram, the first step is to incorporate the core framework with the General Ledger framework of the invention, as represented by the flow diagram box numbered 104. This step includes the incorporation of any object classes necessary for the system on which the application will run. For example, the preferred embodiment achieves operating platform independence and application program inter-operability by extending classes from a set of base business classes that form a core framework (CF). In this first step, the application developer will incorporate object classes necessary for achieving operating system independence and program inter-operability by extending and subclassing from the CF classes. In this way, the general ledger application program can interface with multiple operating systems because only the CF extensions need change to accommodate new operating systems, while the general ledger application can remain the same. In a similar way, companion application programs can more easily interface with the extended application program because the core, common set of CF classes will be known and will form a common interface.

The next step of application program development is to add desired extensions to the general ledger framework, including the user interface. To implement this part of the program development process, the application developer-framework user must decide upon the particular extensions needed for the desired general ledger operations and user interface, including any modifications or extensions to the class attributes and behaviors. The framework extensions are performed by a framework user in a manner dependent on the particular computer system on which the framework is received and manipulated. Such processing is represented in FIG. 1 by the flow diagram box numbered 106.

After the framework extensions are decided upon, the next step is to generate the application program. This step is represented by the flow diagram box numbered 108. The generation of an application program is generally referred to as program compilation. This step also will depend on the particular computer system on which the framework is used. Changes to the compiled program might be desired, both as part of the initial program debug and as part of revisions due to comments received from actual use. The process of determining such desired changes is represented by the flow diagram box numbered 110. When such changes are determined, they must be implemented into the program structure in the form of modified classes, attributes, and methods, which comprise further extensions to the framework. This is represented by the flow diagram path from the "determine changes" step at box 110 back to the "add desired extensions" step at box 106.

Thus, the design of the general ledger framework provides base classes on which application program developers can build to add specific features they deem important. With the core business classes, the framework classes can remain platform independent so that framework extensions are simplified. The application is easily modified without need for writing multiple versions of the program code because the revision of framework classes, attributes, and methods in accordance with the invention is platform independent. Easier development of new code, and seamless operation with applications using the same core classes, is ensured.

2. Operational Structure

Figure 2:
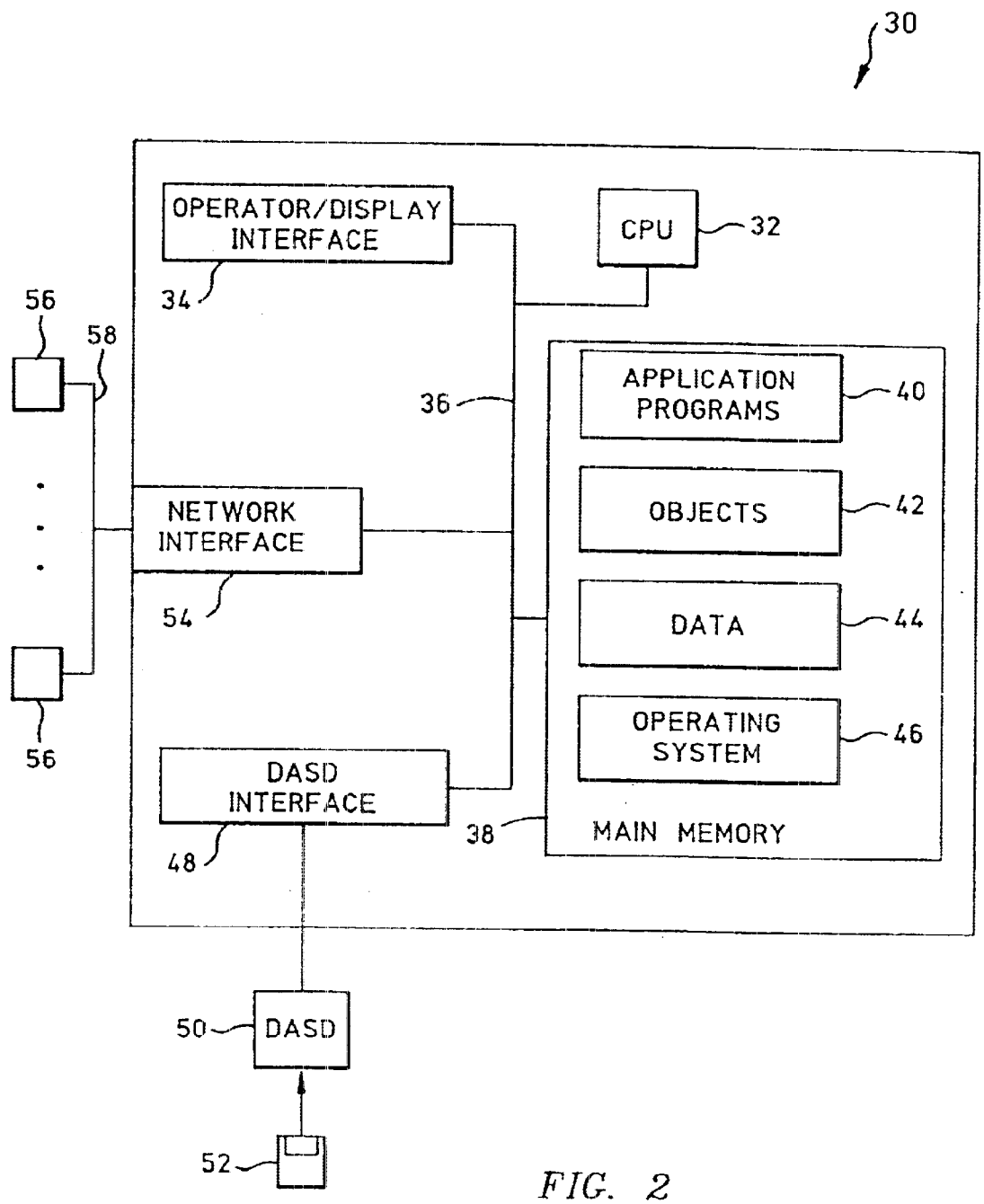
FIG. 2 is a block diagram of a computer system constructed in accordance with the invention.

FIG. 2 is a block diagram of a computer system 30 constructed in accordance with the present invention. The computer system is suitable for utilizing the framework of the invention to develop an application program, and for using the extended framework application program. The computer system 30 includes a central processing unit (CPU) 32 that operates in response to operator commands, which it receives from an operator/display interface 34 to which it is connected by a system bus 36. The CPU also communicates over the system bus with a main memory 38. The main memory is illustrated containing a variety of data structures, including application programs 40, objects 42, data 44, and an operating system 46. The main memory 38 is represented as a single entity, but those skilled in the art will appreciate that the main memory can comprise a combination of random access memory (RAM), hard disk drives, optical disk drives, and other storage devices containing logically segmented storage locations.

The operating system 46 preferably supports an object oriented programming environment such as provided, for example, by the C++ programming language. The application programs 40 are invoked, or launched, by a user through the operator/display interface 34. The application programs can be written in a variety of languages, including C++. The objects 42 are object data structures of an object oriented programming language, such as C++.

The computer system 30 also includes a direct access storage device (DASD) interface 48 that is connected to the system bus 36 and also is connected to a DASD 50. Those skilled in the art will appreciate that the DASD 50 can receive and read from program products comprising machine-readable storage devices 52, such as magnetic media disks on which are recorded program instructions whose execution implements the framework of the present invention. The storage devices 52 also can comprise, for example, media such as optical disks and other machine-readable storage devices. The computer system 30 also includes a network interface 54 that permits communication between the CPU 32 and other computer systems 56 over a network 58. The other computer systems 56 can comprise, for example, computer systems similar in construction to the exemplary computer system 30. In that way, the computer system 30 can receive data into the main memory 38 over the network 58 after communication between the computer systems has been established by well-known methods that will be understood by those skilled in the art without further explanation.

3. System Modules

Figure 3:
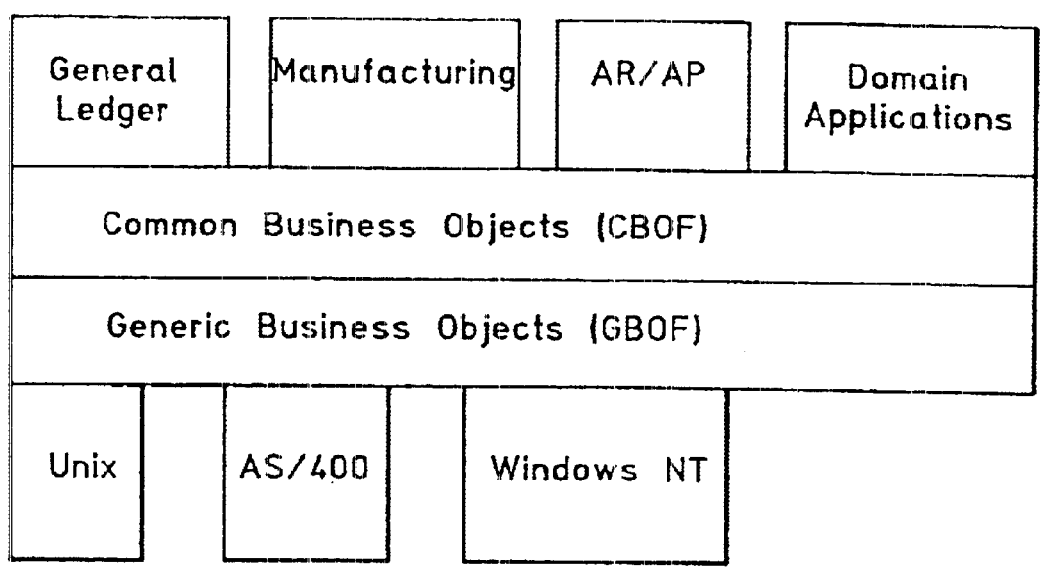
FIG. 3 is a representation of the framework that operates in the system of FIG. 2, showing the General Ledger (GL) mechanism that comprises the general ledger framework, and also showing related Accounts Receivable (AR) and Accounts Payable (AP) mechanisms, and common business objects utilized by the GL General Ledger framework.

FIG. 3 is a representation of the framework that operates in the system of FIG. 2, showing the General Ledger module, or mechanism, that comprises the general ledger system that is the subject of this description. The General Ledger mechanism is shown attached to a Common Business Objects framework (CBOF) mechanism and a Generic Business Objects framework (GBOF) mechanism, which together comprise a base or core framework (CF) utilized by the framework of this invention. The CF provides common functionality to permit communication between application mechanisms (such as General Ledger) and different operating platforms, which are indicated in FIG. 3 by the modules indicated as "Unix", "AS/400", and "Windows NT" attached to CF.

Application developers will add subclassing to the classes of which CBOF and GBOF are comprised. The classes of CBOF, for example, will include company identification classes that can serve as base classes for defining companies to multiple application programs. A CBOF "Company" class might contain general identifying company information, while the general ledger framework of the invention might extend from the CBOF and include "Company" classes that identify financial accounting parameters of the Company. Another application program, such as a manufacturing application, might include company classes that identify finished products of the Company. The GBOF classes are more directly related to the operating system and computer system side of the operating environment. That is, the GBOF classes are responsible for object persistence according to the operating system and object environment being supported, so that a General Ledger object that wants to maintain an object in persistent data storage must interface with GBOF classes. All application programs in related "business object" subject areas, or domains, should be able to make use of the common object classes specified by the CBOF and GBOF classes.

In FIG. 3, mechanisms called Accounts Receivable and Accounts Payable (AR/AP) are shown attached to the CF (CBOF/GBOF) combination with a Manufacturing mechanism (application) and a module identified as "Domain Applications". All of these mechanisms are shown attached to the CF to indicate that other modules may be developed to communicate with the General Ledger framework. In this way, other domain applications may communicate with the General Ledger application and similarly interface with different operating platforms. It should be understood that the application mechanisms shown interfacing with the CF and interfacing with the alternative operating systems are exemplary only. That is, it is contemplated that additional domain applications may interface with the General Ledger mechanism, and it is contemplated that additional operating platforms may interface with the General Ledger.

The CF interface, however, does not form a part of the invention described herein. As noted above, those skilled in the art should be able to produce, without further explanation, a framework that provide the common functionality between operating systems and application domains that are provided by CF.

The General Ledger framework functions in a computer system that includes bank transaction categories, accounting categories, and business model categories. After a framework adopter has extended the framework so as to produce an account management application, the end user of the application provides data and commands to the application through the business model categories, provides accounting input through the accounting categories, and receives account reporting information through the account management categories.

4. Category Diagram

Figure 4:
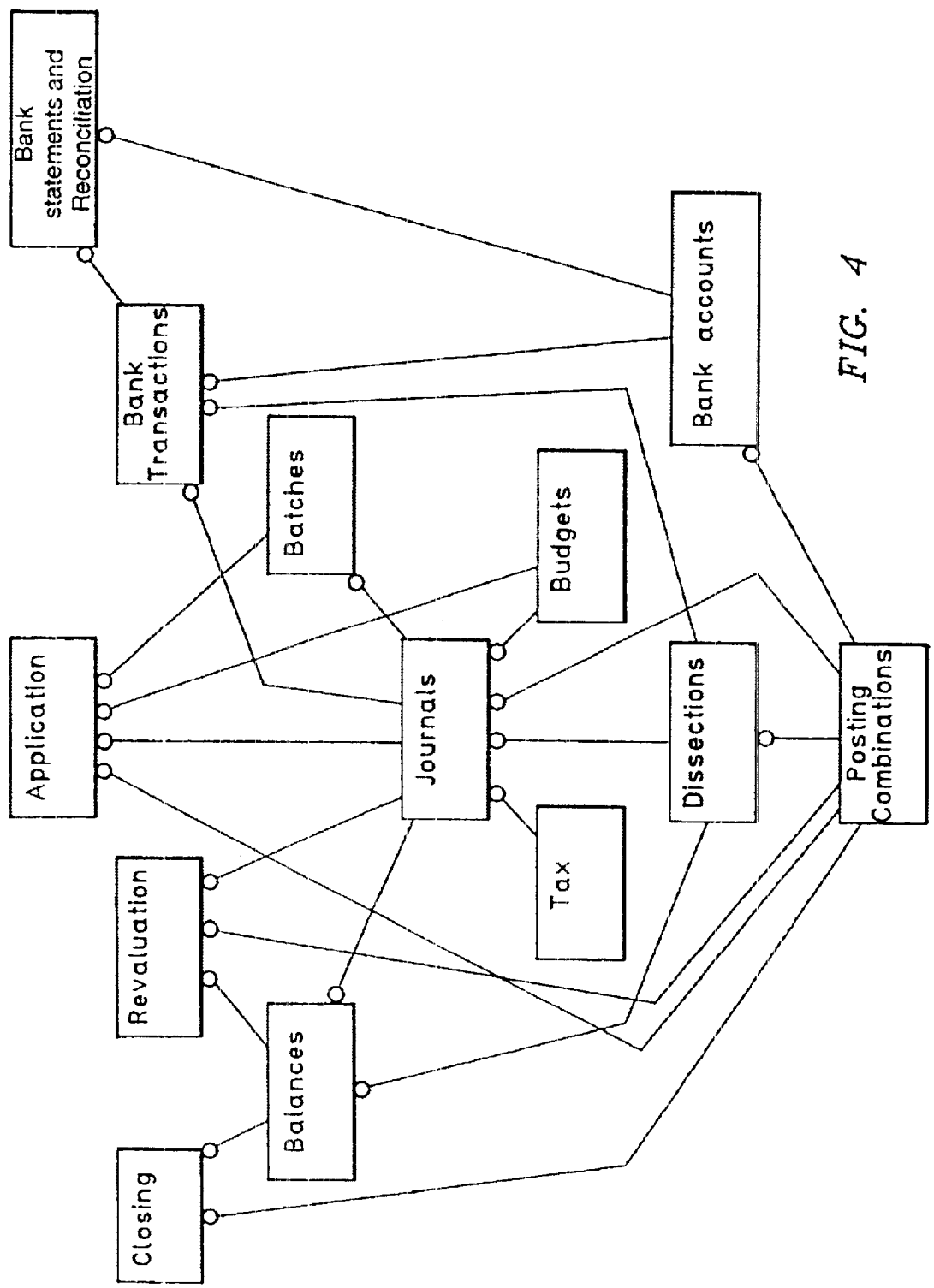
FIG. 4 is a category diagram representation of the General Ledger framework illustrated in FIG. 3.

FIG. 4 is a category diagram for the General Ledger mechanism of the framework implemented in the computer system of FIG. 2. Those skilled in the art will appreciate that the categories illustrated in FIG. 4 contain groups of OOP classes that encapsulate data attributes and behaviors, and are stored in the memory of the computer system. Such classes can be implemented, for example, in a computer system operating environment that supports the C++ programming language. It should be understood that a category as used in this description refers to describing the classes that make up the framework in terms of categories for purposes of easier explanation. The categories do not necessarily represent a structure that is reflected in any programming implementation of the framework.

The framework categories provide a base of information that can be used by program developers and from which extensions can be developed. That is, the inventors of the present framework have identified a set of OOP classes most likely to be desired by developers of general ledger application programs and have defined the relationships between such classes. Those skilled in the art will recognize that such classes can be overridden by users of the framework in that framework users who are developing applications can incorporate extensions and additions that suit the purposes of the user.

The categories of the General Ledger framework will be referred to with a preceding "GL", unless not required by the context in which the category is being described.

The GL categories provided by the framework include a GL Application category of classes that contains company information for general ledger processing, a GL Posting Combinations category of classes that define valid posting combinations for the general ledger, a GL Journals category of classes that create, process, validate, and post GL journals, a GL Bank Accounts category of classes that defines internal and external bank accounts that are used in the general ledger, a GL Bank Transactions category of classes that process bank statements, a GL Bank Statements and Reconciliation category of classes that reconcile bank statements with GL Bank Accounts, and a GL Closing category of classes that validate and close the current accounting period.

The framework also includes mechanisms that are expected to be extended by the application developer to provide optional or specially configured features, thereby acting as extension points from which developers can provide special processing. These additional object categories include GL Batches, which comprises classes that create and maintain a batch of journals to be processed together, GL Budgets, which establishes a budget to be followed and reported against, GL Tax, to contain tax information associated with business transactions, GL Balances, for retrieving account balances for dissection, GL Revaluation, to convert account balances to and from various currencies, and GL Spread Profiles, which spreads the impact of a GL Journal across multiple accounting periods.

5. Class Diagrams

There is no uniform standard for OO programming, but this description will use the widely followed convention that class names comprise descriptive words whose initial letters are upper case.

a. GL Application.

Figure 5:
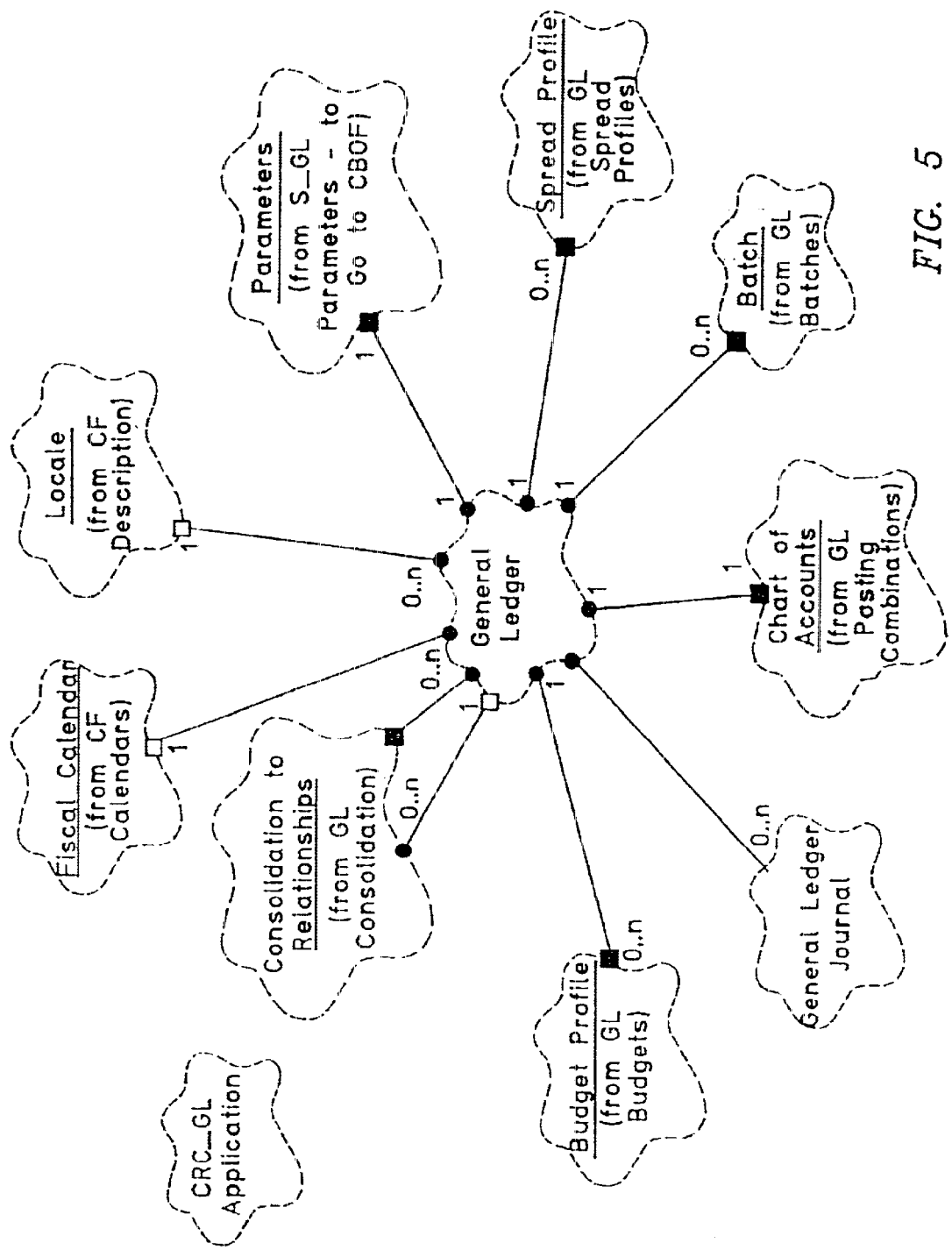
FIG. 5 is a class diagram of the General Ledger (GL) Application category illustrated in FIG. 4, showing the General Ledger class and related classes.

FIG. 5 is a class diagram that illustrates the characteristics of the class called General Ledger. The framework defines a General Ledger class of objects, which are said to be "from" the GL Application category, meaning that the General Ledger class of objects is conceptualized in the framework description as part of a larger GL Application class. FIG. 5 shows that the General Ledger class has ownership of objects called Parameters, Spread Profile, Batch, Chart of Accounts, Budget Profile, and Consolidation to Relationships. It should be understood that the ordinality illustrated in the object diagrams is for purposes of illustration only and that the ordinality of any particular implementation may be different from that shown in the drawings without departing from the teachings of the invention.

A General Ledger object has ownership over, and therefore has control over the existence and creation of, a Parameter object, one or more Spread Profile objects, one or more Batch objects, one Chart of Accounts object, one or more Budget Profile objects, and one or more Consolidation to Relationships objects. FIG. 5 shows that the General Ledger object is in a "has" relationship with a General Ledger Journal object, so that a General Ledger Journal object is associated with the General Ledger object. Finally, FIG. 5 shows that the General Ledger object refers to objects from classes called Fiscal Calendar and Locale, which are indicated as being "from" categories called "CF Calendars" and "CF Description", respectively. In the preferred embodiment, these category groupings of objects are from the base framework CF described above, to which the program developer adds a user interface for the application program. That is, the general ledger framework is used in conjunction with a set of general business objects from CBOF and GBOF frameworks that provide inter-platform operating support. The "refers to" relationship indicates that General Ledger makes use of these two objects but has no control over their existence.

More particularly, the General Ledger object defines the financial-related company structure of a Company (defined by the application program end-user) for which the general ledger application will be produced following extension of the framework. In the preferred embodiment, the Company object is from a CBOF class that is extended and subclassed by the application developer through the General Ledger object. The General Ledger object provides financial information about the Company to supplement other Company-identifying information supplied by other objects of CF.

The Locale object referred to by the General Ledger object is from CF and identifies the company defined by the program end-user for purposes of determining application language and resulting numeric format defaults of the financial data. The GL Parameters object contains access parameters that control various aspects of the application processing.

The Spread Profile classes provide ratios that control how a general ledger application input will be spread across a range of fiscal periods. The Batch objects create and maintain batches that control a group of Journal objects that are to be processed together. The Chart of Accounts objects create and maintain information about the set of accounts that will be used by the application. The General Ledger Journal objects maintain a relationship between each journal entry, which represents an activity against one or more of the General Ledger accounts, and the impacted accounts. The Budget Profile objects establish a budget for postings against one or more accounts set up by the Chart of Accounts. The Consolidation to Relationships objects establish the relationships between companies necessary for consolidation of general ledgers from multiple-company enterprises. The Fiscal Calendar object defines the accounting periods and years that are used by the General Ledger object to control and measure account activity.

b. GL Posting Combinations.

Figure 6:
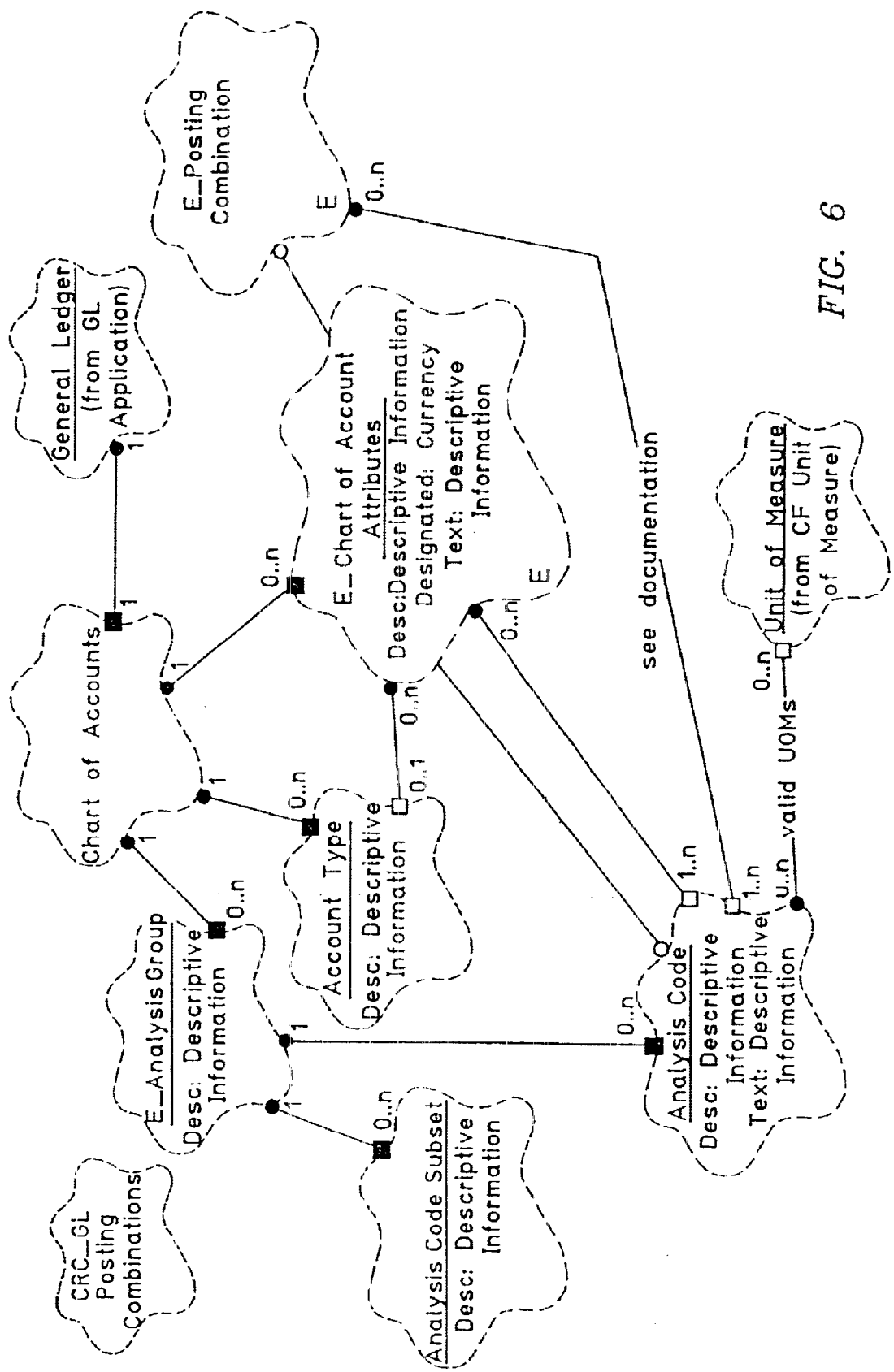
FIG. 6 is a class diagram of the GL Posting Combinations category illustrated in FIG. 4, showing the Chart of Accounts class and related classes.

FIG. 6 is a class diagram that illustrates the characteristics of the GL Posting Combinations category, which is responsible for defining the constituent parts that will make up valid posting combinations for the general ledger maintained by the application program, and also is responsible for ensuring the posting combinations are valid, in accordance with the rules of the user-defined company. FIG. 6 shows that the Posting Combinations category includes a Chart of Accounts class, which was referred to in the FIG. 5 class diagram for GL Application. The Chart of Accounts class defines the accounts structure for the subject company. The objects of this class have a one-to-one relationship with the General Ledger class, as shown by the "ownership" connecting line between the Chart of Accounts class cloud and the General Ledger class cloud in FIG. 6. The Chart of Accounts, however, is defined separately from the General Ledger class so an application developer who uses the framework can totally replace the Chart of Accounts provided without adversely impacting the rest of the general ledger functioning.

The Chart of Accounts class references an Analysis Group class, Account Type class, and Chart of Account Attributes class. The Analysis Group class of objects provides the capability to define groups of analysis codes, the Account Type class is optional and permits specification of particular account types, and the Chart of Account Attributes class provides an extensible class to provide additional account attributes, such as required only for specific analysis codes or combinations of codes.

The Analysis Group class refers to an Analysis Code class and an Analysis Code Subset class. The Analysis Code class defines each of the valid analysis codes in the Analysis Group class. For example, if the Analysis Group were called "Department" then it would probably reference a different analysis code instance for each valid department. The Analysis Code class references a class called Unit of Measure. The Unit of Measure class provides a relationship to Analysis Code that will identify valid units for a quantity posted against an analysis code object.

The Posting Combinations class shown in FIG. 6 defines valid combinations of analysis codes and assures that the combinations on general ledger postings are valid. This class of objects is another example of an extensible class that will be modified by the application developer, in this case to implement processing rules for defining valid combinations. FIG. 6 shows that the Posting Combinations class references the Chart of Account Attributes class and the Analysis Codes class described above. In particular, the Posting Combinations class references the Chart of Account Attributes to check attributes associated with specific combinations and references the Analysis Codes for information about the analysis codes that make up the posting combination.

c. GL Journals.

Figure 7:
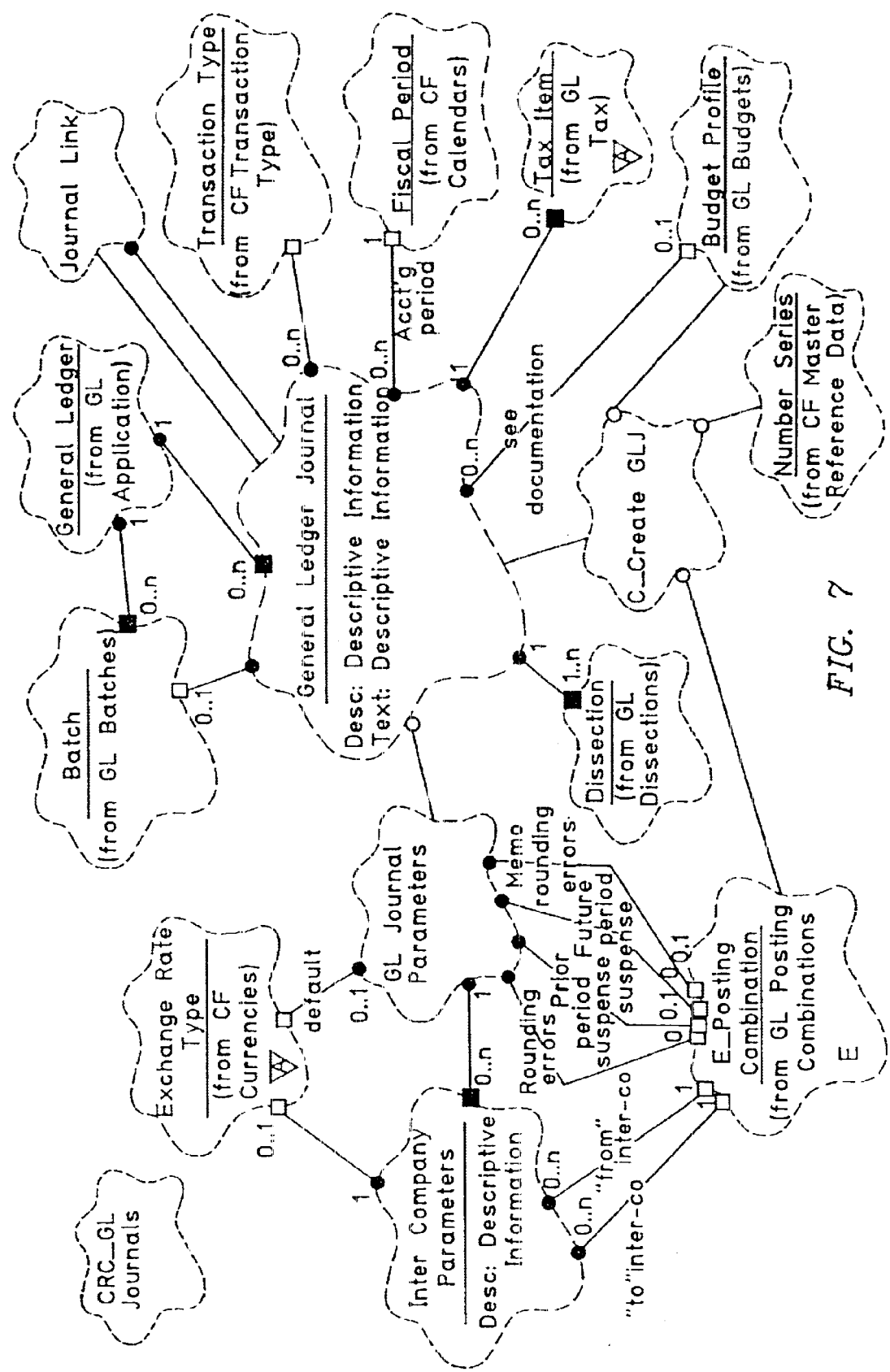
FIG. 7 is a class diagram of the GL Journals category illustrated in FIG. 4, showing the General Ledger Journal class and related classes.

FIG. 7 is a class diagram that illustrates the characteristics of the GL Journals class category, which is responsible for creating, processing, validating, and posting general ledger journals. If desired, the Journals class can optionally group journals in batches. The Journals class also maintains parameters that are used when processing and posting journals.

FIG. 7 shows that the Journals category includes a Create GLJ class. In the drawing, the class name is indicated as "C_Create GLJ", where the "C" prefix indicates a control class that performs core functions within the framework and that are not to be replaced by the framework user. As with the extendible classes, the control classes may be interchangeably referred to with and without their "C" prefix. The Create GLJ class controls creation of the general ledger journals and passes information about a created journal and it's dissections to the General Ledger object that actually creates the journal. The created general ledger journals will be members of a General Ledger Journal class, shown in FIG. 6 connected to the Create_GLJ class cloud.

In FIG. 7, the Create GLJ class is shown referencing the Posting Combinations class, a Number Series class, a Budget Profile class, and the General Ledger Journal class. As noted above, the Posting Combinations class is an extendible class that permits the framework user/application developer to implement particular business rules to assign and validate combinations of accounts that a journal will affect. The Number Series class assigns a unique reference number for a created journal. The Budget Profile class is used because the framework posts budgets as journals. Thus, if a "journal" (Journal object) is really a budget, rather than an actual journal, then the budget journal will be associated with a member of the Budget Profile class.

The General Ledger Journal class comprises the journals created by the Create GLJ class, and can be suspended or posted. As shown in FIG. 6, the General Ledger Journal class references a Batch class, a General Ledger class, a Journal Link class, a Transaction Type class, a Fiscal Period class, a Tax Item class, a Budget Profile class, a GL Dissection class, and a GL Journal Parameters class.

The Batch class comprises a group of journals that are to be processed together and can optionally be assigned to a batch of journals. The General Ledger class is "owned" by a general ledger class for a specific company of the application user. The Journal Link class links together cross period journals, which are journals that require entries in more than one fiscal period. The Transaction Type class identifies the journal type, which is assigned in the general ledger interface based upon business rules defined by the framework user who develops the application. The Fiscal Period class identifies the accounting period to which the journal applies.

The Tax Item class is an abstract class that provides a way for reportable tax information to be associated with a journal entry. An abstract class represents a class that will be extended by the framework user to provide features specially selected by the framework user to add value to the resulting application program. Abstract classes will be designated in the drawings with an "A" enclosed in a triangle within a corresponding class cloud. The Tax Item class provides a framework extension point where application program developers can specialize the application to hold tax information associated with a business transaction for reporting to tax agencies.

The Budget Profile class identifies the combination of analysis codes to which applies a journal object that is really a budget. The GL Dissection class identifies the accounts and amounts for debits and credits resulting from a journal entry. Under normal conditions, there will be at least two dissections for entry, one debit and one credit, unless the journal is suspended. The GL Journal Parameters class contains control data that can be loaded by a company to customize the way in which journals are processed. The GL Journal Parameters class references three other classes, comprising Exchange Rate Type, General Ledger Intercompany Parameters, and, Posting Combinations.

The Exchange Rate Type class identifies a default exchange rate for monetary currencies. The General Ledger Inter-company Parameters class contains the "from" and "to" posting combinations for journals that are maintained between companies or subsidiaries that are part of the same enterprise. The Posting Combinations class comprises an extendible class that permits the framework user to provide an application that implements rules for assigning default posting combinations for a variety of conditions. These conditions can include, for example, how to handle numerical rounding decisions.

d. GL Dissections.

Figure 8:
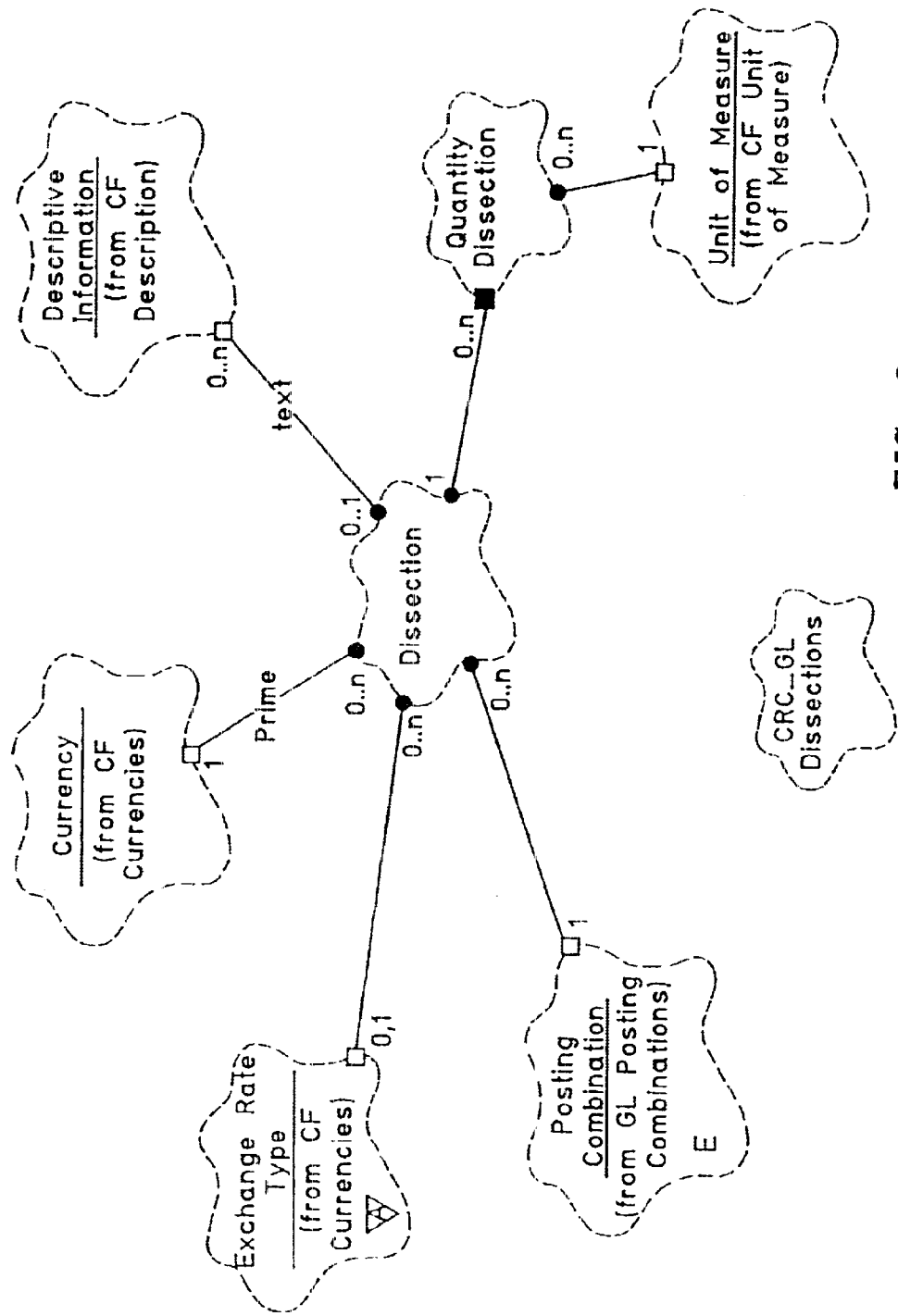
FIG. 8 is a class diagram of the GL Dissections category illustrated in FIG. 4, showing the GL Dissection class and related classes.

FIG. 8 is a class diagram that illustrates the characteristics of the GL Dissections category, which is responsible for spreading the impact of a journal entry across multiple journal accounts. That is, the Dissections class provides the details of a posting in the general ledger. The Dissections category stores details of general ledger dissections, validates the dissections, and provides details of the dissection when requested. FIG. 8 shows that the Dissection category references the Posting Combinations class (described above in connection with the FIG. 6 Posting Combinations category diagram), a Currency class, an Exchange Rate Type class, a Quantity Dissection class, and a Descriptive Information class.

With respect to the Dissections category, the Posting Combinations class validates the combination of an account and, if applicable, one or more analysis codes against which the dissection applies. The Currency class defines the currency in which the dissection was created. This currency is referred to as the prime currency. The Exchange Rate Type class contains the default exchange rate used to convert the prime rate to the base rate for the company. The Quantity Dissection class is used because, in the framework, a quantity can be associated with a dissection for statistical purposes. Such a quantity dissection will also have an associated unit of measure. The Descriptive Information class contains a description of the dissection.

e. GL Batches.

Figure 9:
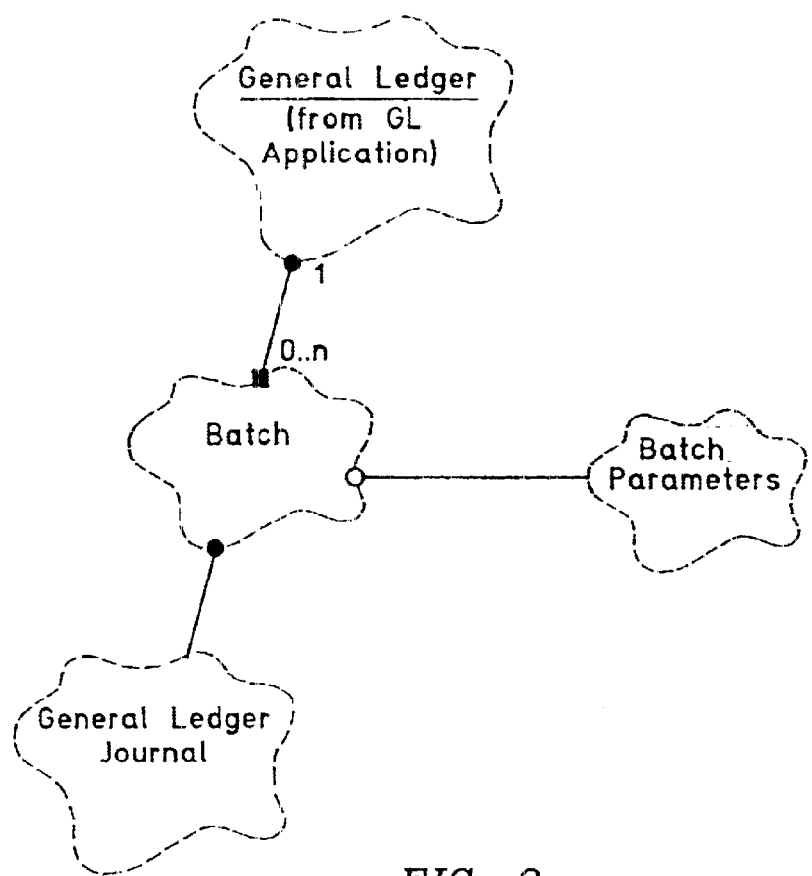
FIG. 9 is a class diagram of the GL Batches category illustrated in FIG. 4, showing the Batch class and related classes.

FIG. 9 is a class diagram that illustrates the characteristics of the GL Batches category, which is responsible for identifying journals that are to be processed together. FIG. 9 shows that members of the Batch class belong to a specific general ledger object of the General Ledger class. The Batch class provides an optional capability to group together a number of journals for processing and control as a group. The GL Batches category references the General Ledger Journal class (described above in connection with the FIG. 4 Application category diagram) and the GL Batch Parameters class (described above in connection with the FIG. 7 Journals category diagram), which contains data that controls how batches of journals are to be processed for the company.

f. GL Budgets.

Figure 10:
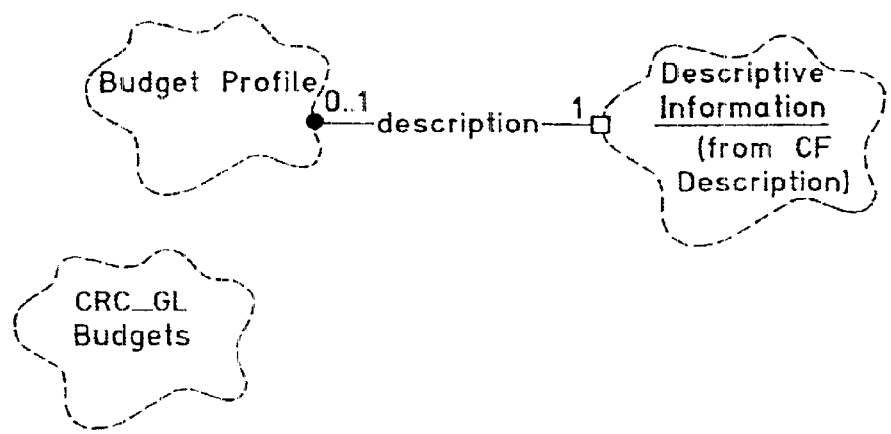
FIG. 10 is a class diagram of the GL Budgets category illustrated in FIG. 4, showing the Budget Profile class and related classes.

FIG. 10 is a class diagram that illustrates the characteristics of the GL Budgets category, which contains the Budget Profile class as described in greater detail above in connection with the FIG. 7 description of the Journals category. The Budget Profile class establishes a budget that will be held for a number of posting combinations and tracks actuals, comprising GL Journal postings against posting combinations covered by the budget. The Budget Profile class references a Descriptive Information class, which provides a descriptive name for the objects of the Budget Profile class.

g. GL Balances.

Figure 11:
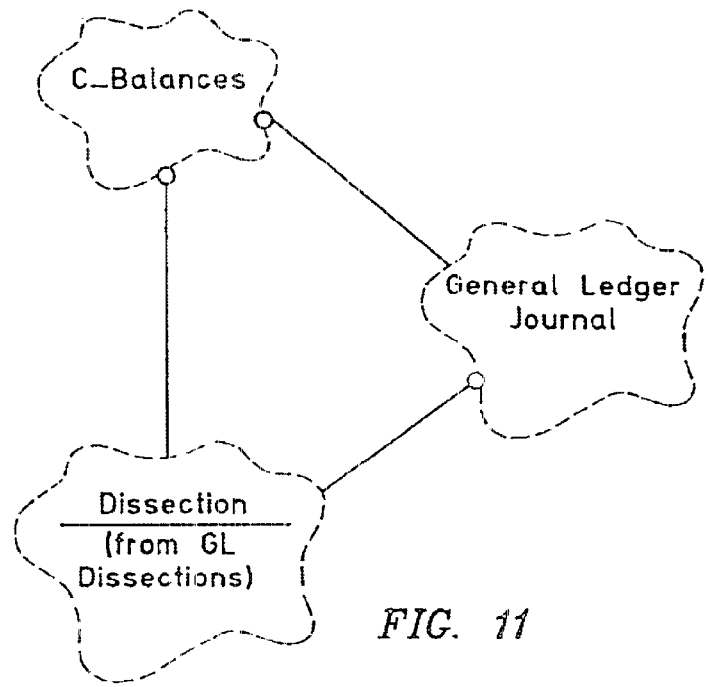
FIG. 11 is a class diagram of the GL Balances category illustrated in FIG. 4, showing the Balances class and related classes.

FIG. 11 is a class diagram that illustrates the characteristics of the GL Balances class, a core class that retrieves totals for dissections against accounts or analysis codes and provides a general capability to specify ranges of accounts for which balances are to be returned. The Balances class masks the implementation of balances, which may be cached or calculated, from the requestor. FIG. 11 shows that the Balances class references the GL Journals class, which retrieves dissection balances for a range of journals, and references the GL Dissections class, which is used to retrieve dissections balances against a range of posting combinations.

h. GL Bank Accounts.

Figure 12:
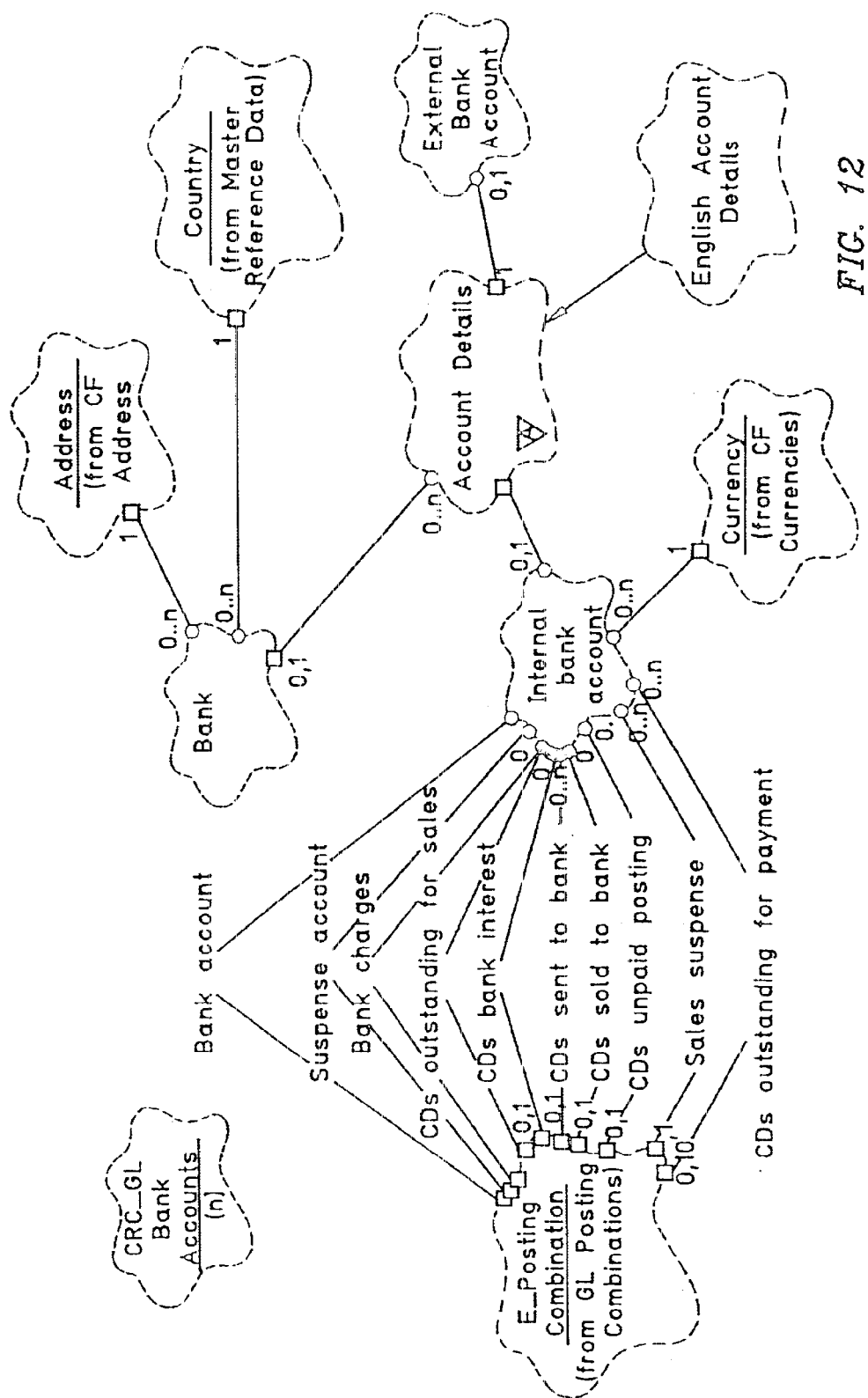
FIG. 12 is a class diagram of the GL Bank Accounts category illustrated in FIG. 4, showing the Account Details class and related classes.

FIG. 12 is a class diagram that illustrates the characteristics of the GL Bank Accounts category, which defines the banks and bank accounts (both internal and external) that are used in the general ledger, as well as the combined accounts receivable and accounts payable ledger. FIG. 12 shows that the Bank Accounts category includes an External Bank Account class, which defines a bank account held by another company, such as a business partner. The External Bank Account is used when the subject company elects to directly deposit in or withdraw from the bank account of the business partner.

The External Bank Account class references an Account Details class, which provides a base structure for a bank account that is common for all bank accounts, regardless of country. The Account Details class will be extended by the application developer to implement the attributes of a bank account required in each particular country. As an example, FIG. 12 shows an English Account Details class member inheriting from the parent Account Details class.

The Account Details class references a Bank class and an Internal Bank Account class. The Bank class defines the bank that holds the subject account (referenced by Account Details). The Bank class therefore references, for example, classes called Address and Country. The Address class is used to input and validate the address of the subject bank, based upon the appropriate conventions of the locale, and the Country class contains information about the country in which the bank is located. The Internal Bank Account class defines a bank account of the subject company to which the General Ledger class object belongs. The Internal Bank Account references account details in the same manner in which the External Bank Account does.

FIG. 12 shows that the Internal Bank Account class references the Currency class (described above) and also references the Posting Combinations class, with multiple references indicated. The multiple references to Posting Combinations are to identify the combinations of analysis codes and accounts that will apply for internal bank accounts. The nature of the illustrated references should be clear to those skilled in the art from review of the reference titles; additional references can be defined by the framework user. Some of the references will be mandatory, such as the reference to the bank account posting combination, which identifies the basic posting combination for the account. Most of the references shown in FIG. 12 are optional, including the optional specification of a suspense account that can be used to hold transactions against the bank account pending confirmation upon receipt of a bank statement.

j. GL Bank Transactions.

Figure 13:
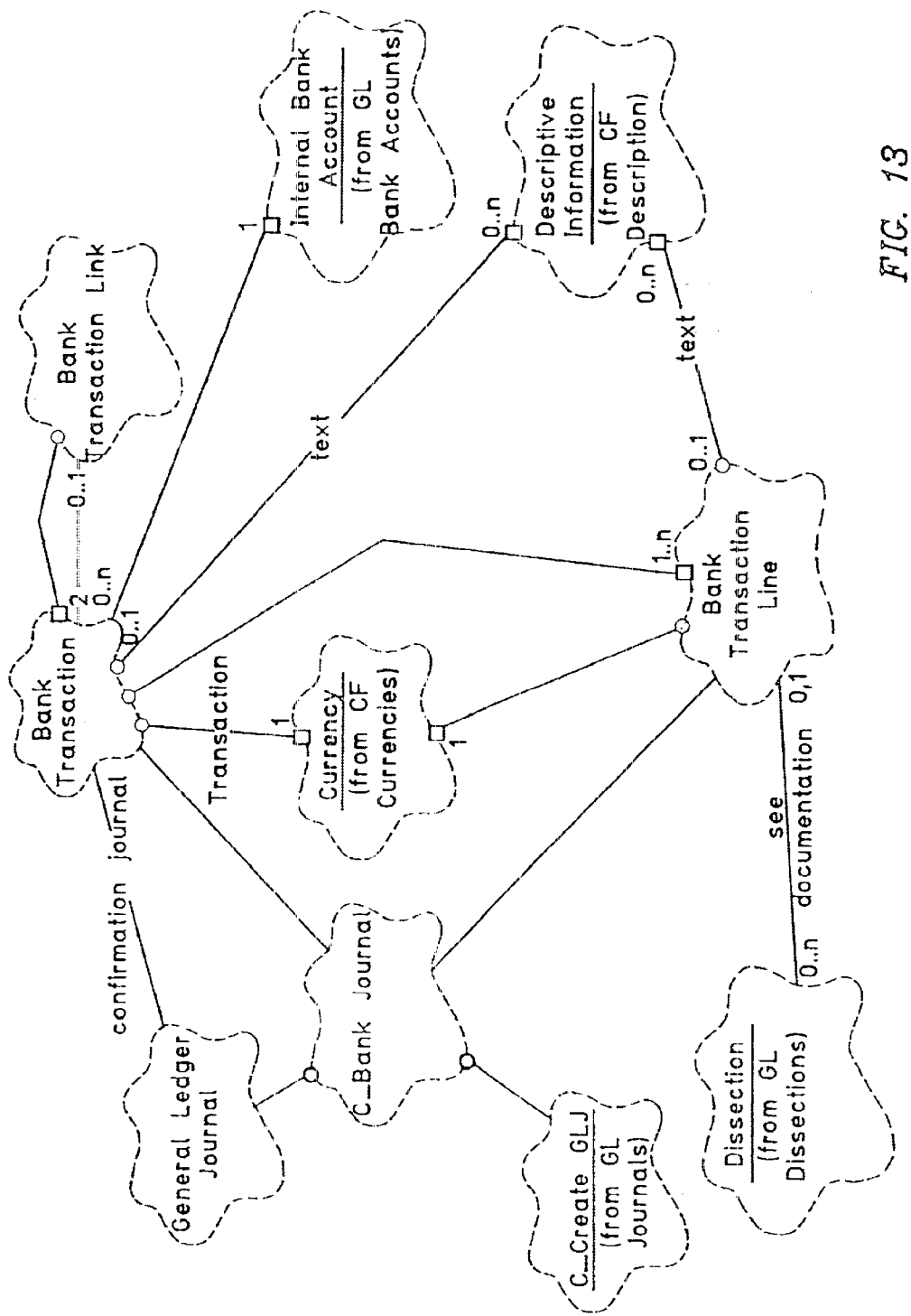
FIG. 13 is a class diagram of the GL Bank Transactions category illustrated in FIG. 4 showing the Bank Transaction class and related classes.

FIG. 13 is a class diagram that illustrates the characteristics of the GL Bank Transactions category, which is responsible for creating journals that update bank posting combinations. This category includes the Bank Transaction class, which maintain information in the General Ledger category necessary to support reconciliation with periodic statements received from banks. FIG. 13 shows that the GL Bank Transactions category includes the Bank Transaction class and the Bank Journal class.

The Bank Transaction class represents the actions of the company running the application program generated by the framework user. The actions may include, for example, deposits, withdrawals, and transfers. The actions are applied against the internal bank accounts of the company at the level at which the action is observed by the bank. The Bank Transaction class references a Bank Transaction Line class, which represents the actions at the level at which the action is observed by the company. When the company writes a check, the Bank Transaction class and the Bank Transaction Line have a one-to-one correspondence. When the company makes a deposit, one Bank Transaction class member (object) can have several Bank Transaction Line members representing cash payments and checks received from company customers.

Figure 14:
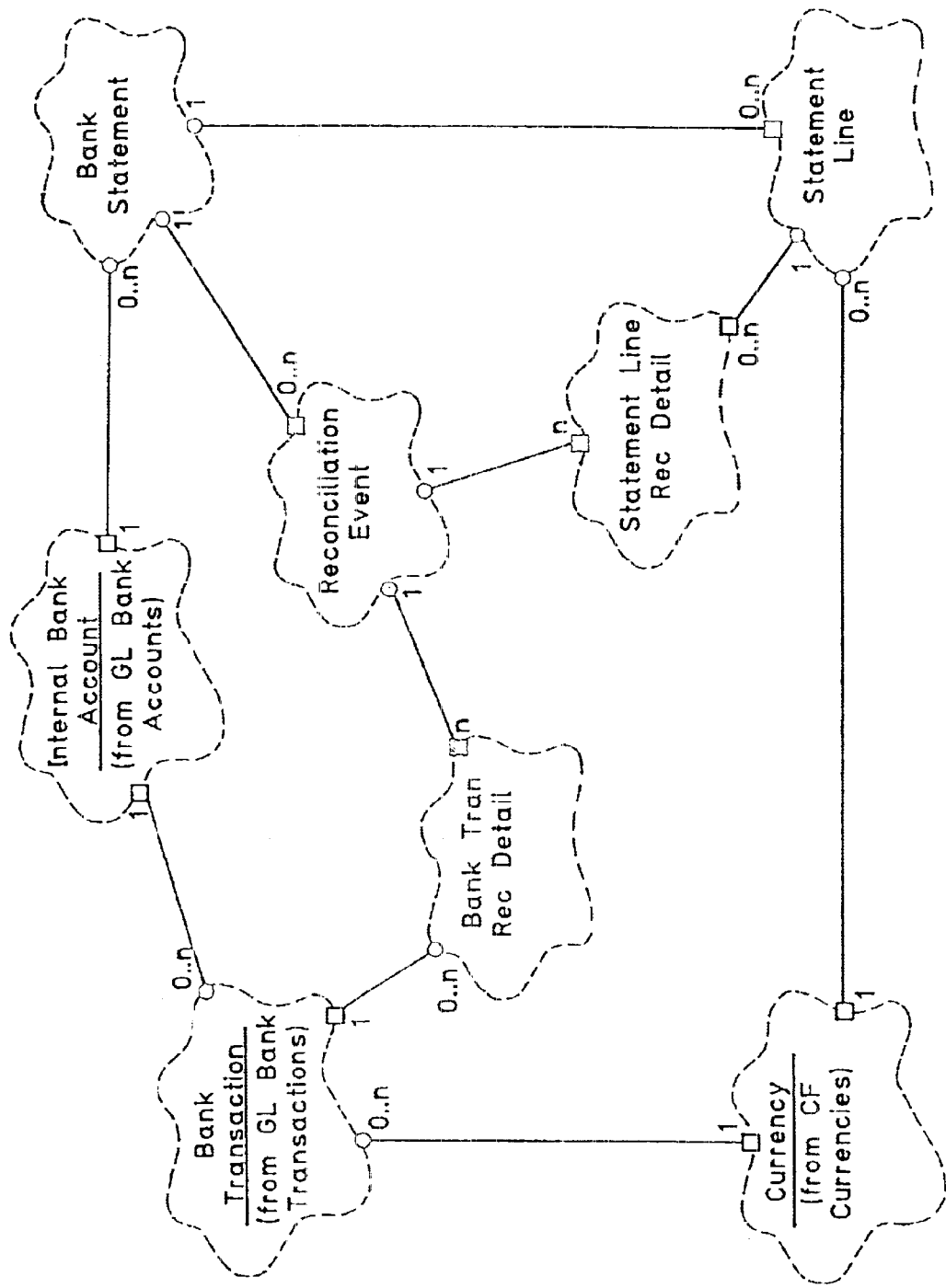
FIG. 14 is a class diagram of the GL Bank Statements and Reconciliation category illustrated in FIG. 4, showing the Bank Statement class and related classes.

FIG. 14 shows that the Bank Transaction class references a General Ledger Journal class to reference a confirmation journal line, which is an input based upon a Bank Statement. The confirmation journal is optionally used to move a bank transaction from a suspense status to a posted status. The Bank Transaction also references the Currency class, which contains the prime currency for the subject bank transaction, and also references the Bank Transaction Line class, which contains details of the bank transaction as observed by the company, as described above.

The Bank Transaction Line class references the Currency class (as does the Bank Transaction class), the Descriptive Information class, and the GL Dissections class. The Descriptive Information class is an optional description of the bank transaction line. The GL Dissections class tracks the dissections associated with a Bank Transaction Line. For example, such a line may be posted to a suspense account, posted to a final posting combination, or may be out of suspense account on confirmation.

As shown in FIG. 14, the Bank Transaction class also references the optional Descriptive Information class, the Internal Bank Account class, and the Bank Transaction Link class. The Internal Bank Account identifies the bank account owned by the company against which the bank transaction was recorded. The Bank Transaction Link ties together two bank transactions that represent a transfer from one internal bank account to another.

Finally, the Bank Transaction class also references a control class called Bank Journal, which contains the business knowledge to control creation of bank transactions and bank transaction lines. The Bank Journal class in turn references the Create GL Journals class, which is used to create the GL journals and dissections for the payments and receipts reflected by the bank transactions, and references the General Ledger Journal class, which is referenced to find a specific suspended journal to confirm it.

k. GL Bank Statements and Reconciliation.

FIG. 14 is a class diagram that illustrates the characteristics of the GL Bank Statements and Reconciliation category, which loads bank statements based upon input from banks and is responsible for reconciling bank statements with GL bank accounts. FIG. 14 shows that the primary classes in the Bank Statements and Reconciliation category include an Internal Bank Account class, a Reconciliation Event class, a Statement Line class, and a Bank Transaction class.

FIG. 14 shows the Statement Line class and the Bank Transaction class both reference the Currency class, described above. The Statement Line class holds information about a bank statement detail line, which reflects the bank's view of a deposit, withdrawal, or transfer against the bank account. To perform its function, the Statement Line also references a class called Statement Line Reconciliation Detail, which identifies a reconciliation event that covers all or part of the statement line. The Bank Transaction class holds information about a bank transaction, which reflects the company's observation of a deposit, withdrawal, or transfer against the bank account. To perform its function, the Bank Transaction also references the Bank Transaction Reconciliation Detail class.

The Reconciliation Event class shown in FIG. 14 ties together information about bank transactions and bank statement lines that have been found to relate to the same activity. One bank transaction can potentially match to multiple bank statement lines, and one bank statement line can match to multiple GL bank transactions. The reconciliation event class members enable the many-to-many matching. The Reconciliation Event class references a Bank Transaction Reconciliation Detail class (abbreviated in FIG. 14 as Bank Txn Rec Detail), which holds the value of the bank transaction or a portion thereof that is covered by the reconciliation event, and references a Statement Line Reconciliation Detail class. As noted above, this class holds the value of a statement line or portion thereof that is covered by the reconciliation event.

l. GL Revaluation.

Figure 15:
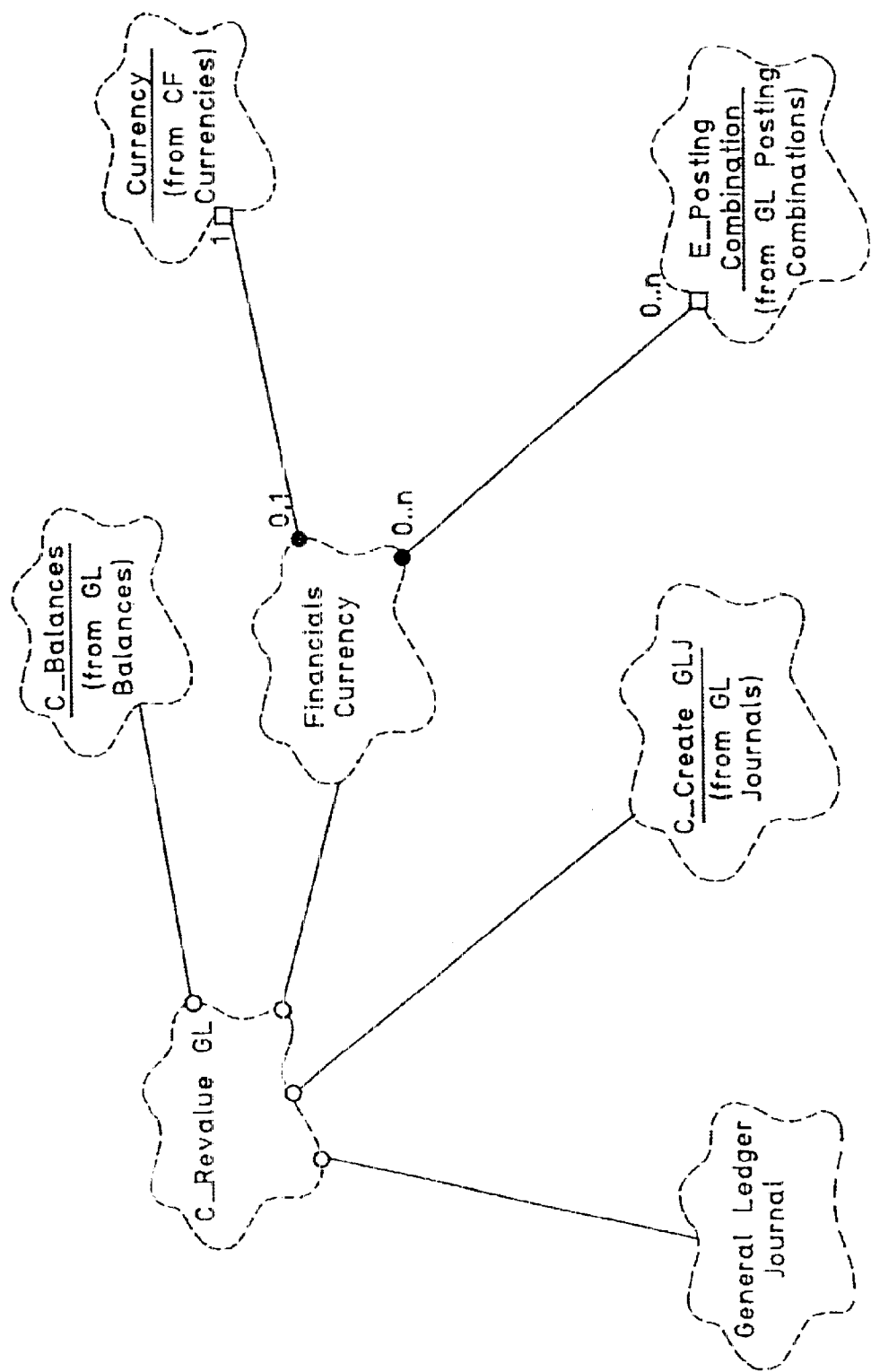
FIG. 15 is a class diagram of the GL Revaluation category illustrated in FIG. 4, showing the Revalue control class and related classes.

FIG. 15 is a class diagram that illustrates the characteristics of the GL Revaluation category. This category converts the current prime balances on a general ledger account to a base currency and writes off the variance to the current base to currency gain or loss. FIG. 15 shows that this category includes a control class called Revalue GL, which controls the process of revaluating the general ledger accounts that have postings in different currencies from the base currency of the company.

The Revalue GL class uses the classes called Balances, Financials Currency, Create GL Journals, and General Ledger Journal. The Create GL Journals and the General Ledger Journal classes were described above. The Balances class was described above in connection with the Balances category, and retrieves the dissection balances for selected GL accounts. The Financials Currency provides the aspects of currency that are unique to the financial domains. This class associates each of the currencies in which the company does business to the posting combinations that are to be used to record gains and losses realized due to currency revaluation. In FIG. 15, therefore, the Financials Currency class is shown referencing the Currency class and the Posting Combinations class.

m. GL Closing.

Figure 16:
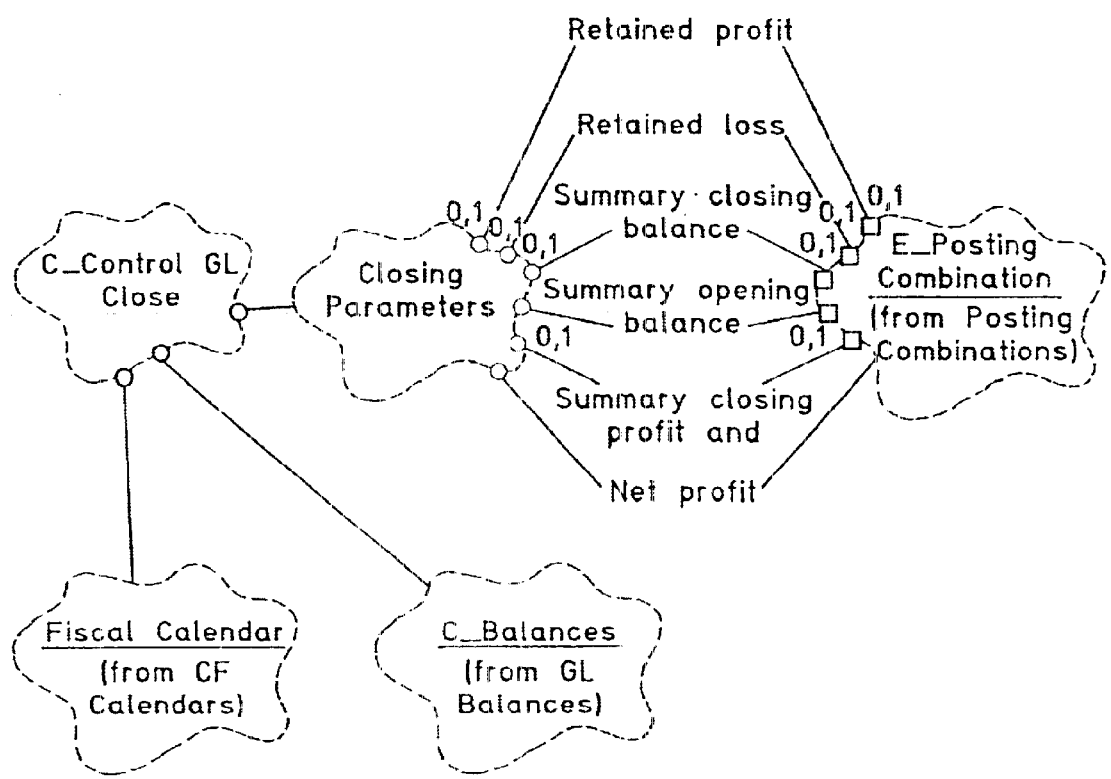
FIG. 16 is a class diagram of the GL Closing category illustrated in FIG. 4, showing the Close class and related classes.

FIG. 16 is a class diagram that illustrates the characteristics of the GL Closing category, which is responsible for validating and closing the current accounting period or accounting year, and opening the next accounting period or year. FIG. 15 shows that this category includes a control class called Control GL Close, which controls the closing and opening for both the period end and year end. The Control GL Close class uses a Fiscal Calendar class, the Balances class, and the GL Closing Parameters class. The Fiscal Calendar class moves the current accounting period ahead to the next period. The Balances class is used to retrieve balances for selected accounts for purposes of creating period end or year end closing journals.

The GL Closing Parameters class identifies the types of actions that will take place as part of an accounting period or year end closing. This class includes relationships to identify the posting combinations to be used for closing journals to record retained profit and loss, and net profit. This class also provides for optional posting combinations for summary year-end closing balances and new year opening balances.

n. GL Spread Profiles.

Figure 17:
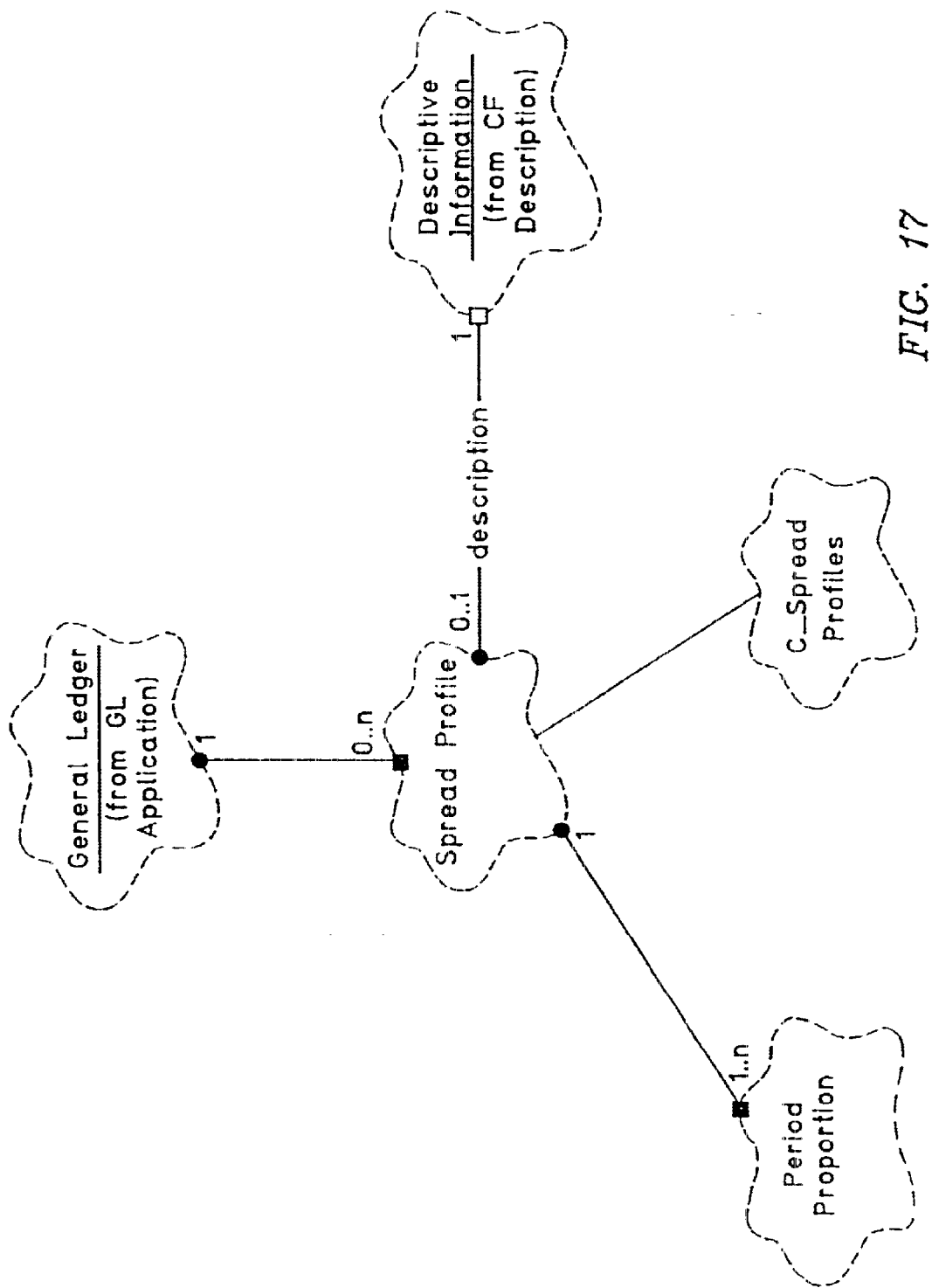
FIG. 17 is a class diagram of the GL Spread Profiles category illustrated in FIG. 4, showing the Spread Profile class and related classes.

FIG. 17 is a class diagram that illustrates the characteristics of the GL Spread Profiles category, which provides the capability of spreading the impact of a GL Journal across multiple accounting periods. FIG. 17 shows that this category includes a General Ledger class (described in the GL Application category) that references a Spread Profile class to determine when and how to spread a GL Journal across multiple accounting periods. The Spread Profile class defines how a journal type should be spread by referencing a Period Proportion class, a Descriptive Information class, and a Control Spread Profile class. In the preferred embodiment, the Period Proportion class identifies the number of periods and the percent or amount for each period across which a journal will be spread, the Control Spread Profile class is a control class that controls the process of spreading a journal across multiple periods. As described above, the Descriptive Information class is from the Description category and describes the budget profile being used.

6. Processing of Extended Framework

As described above, the framework user will utilize the class and method definitions, with appropriate extensions and overrides, to produce a desired application program. Thus, as is the case with object oriented programming principles, details of the extended framework processing will depend on the particular extensions implemented by the framework user. Nevertheless, the processing enabled by the framework can be described in terms of the classes and methods defined by the present invention. Particular processing tasks performed by the extended system can be described in a step-wise, procedural fashion. The following description, therefore, should be understood to apply to the operating steps performed by the extended framework. Those skilled in the art, however, will understand that the flow of processing is not necessarily sequential through the flow diagram boxes, as objects will perform processing in accordance with their attributes and methods.

The framework classes define ledger setup and maintenance activities, ongoing payment activities, and period-related ledger activities. The setup and maintenance activities include general ledger functions, account charts and management, process hierarchies to be followed; budgets, and account profiles. The ongoing activities are further characterized as ledger posting, bank reconciliation, or miscellaneous payments. Finally, the period-related activities include accounting period close activities, currency revaluation functions, and consolidation of general ledger companies.

a. Creation of the General Ledger Journals.

With respect to the setup and maintenance activities, the class called Create GLJ controls the creation of the general ledger journals, which are implemented as instantiations (that is, objects) of the General Ledger Journals class. This processing is represented by the flow diagram of FIG. 18. In the first processing step of journal creation, indicated by the FIG. 18 flow diagram box numbered 202, a Create GLJ object is created. In particular, the application program user will communicate the desire for ledger creation through the user interface, which can be crafted by the application program developer according to well-known programming techniques. For example, a graphical user interface may be presented to the application user on a display such as illustrated in FIG. 2. In the preferred embodiment, an application user that is a client of a server is not permitted to create persistent data objects. Therefore, after the object oriented programming environment is established, any persistent objects must be created and stored in the server. Thus, an application user in a client-server environment must provide the data necessary for creation of the desired object to the server. The server will then invoke a command that will call the object method, pass the received information, and cause creation of the specified object.

Figure 18:
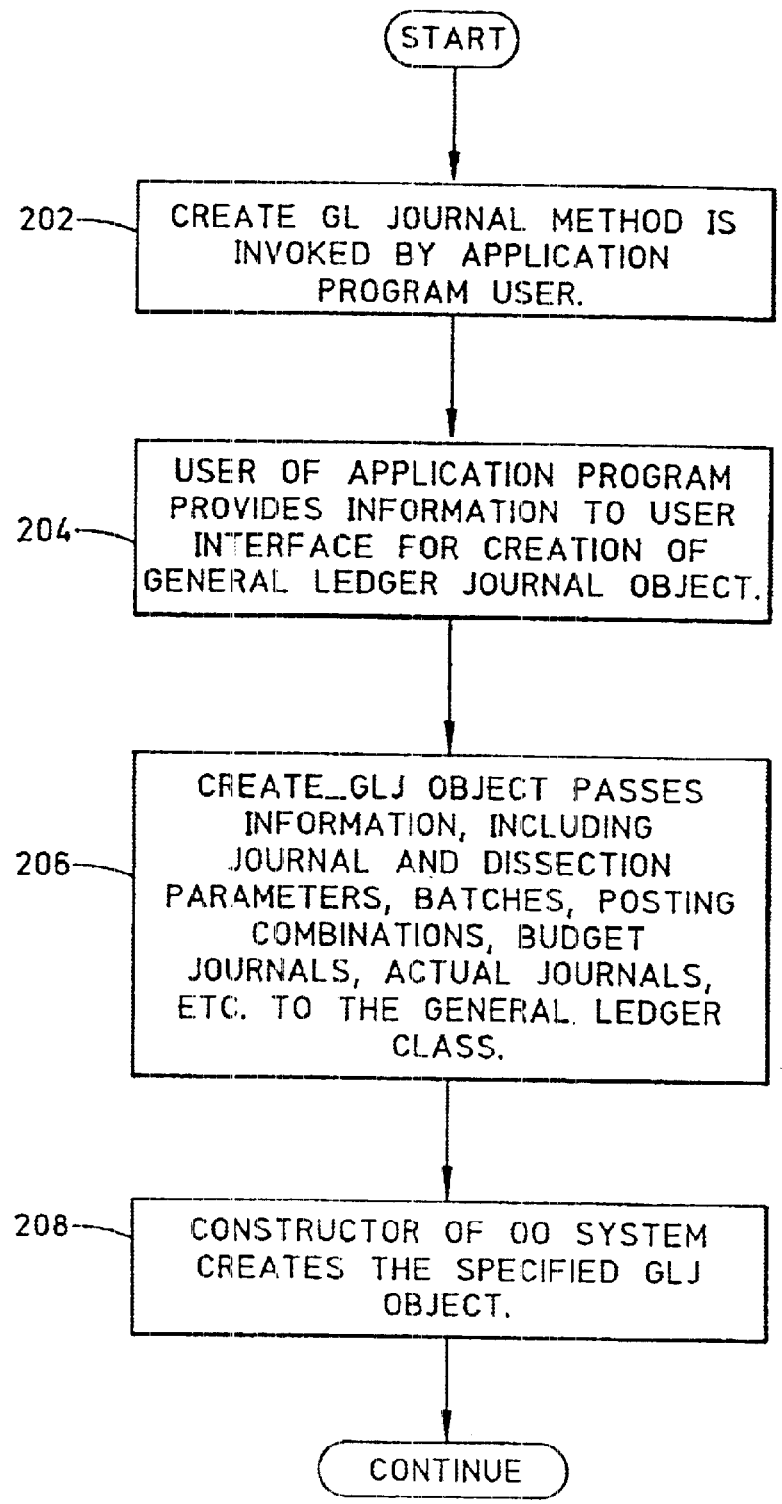
FIG. 18 is a flow diagram representation of the processing carried out by the Create GLJ class illustrated in FIG. 7 and FIG. 13.

After the client process indicates a desire to create the requisite object, the Create GLJ object will next prompt the application program user for the information needed to create a General Ledger Journal object. This step is represented in FIG. 18 by the flow diagram box numbered 204. The information requested from the application program user will include the attributes described above in conjunction with the FIG. 7 illustration of the General Ledger Journals class. Therefore, the information will include specification of journal and dissection parameters, journal batches, posting combinations, budget journals or actual journals selection, and the like.

After the object information is received, the next step in the computer system processing is for the Create GLJ class object to pass the received ledger journal information to the General Ledger Journal class of the object oriented programming system. This step is represented by the flow diagram box numbered 206. In this way, the Create GLJ class object operates like a command. The next processing step occurs when the General Ledger Journal class invokes a creator routine of the object oriented programming system in which the application program is executing, which completes the creation step by placing appropriate data structures of the computer system memory. This next step is represented by the FIG. 18 flow diagram box numbered 208. Operation of the computer system continues with further processing, depending on the information entered by the user.

b. Retrieval of Balances.

One of the functions performed by general ledger operations is the retrieval of balance totals for dissections against accounts or analysis codes specified by the user. The framework is designed to permit the user to specify ranges of accounts for which balances are to be returned. These operations are controlled by objects of the class called Balances, as illustrated in FIG. 11. The operation of the Balances objects is represented by the flow diagram of FIG. 19.

Figure 19:
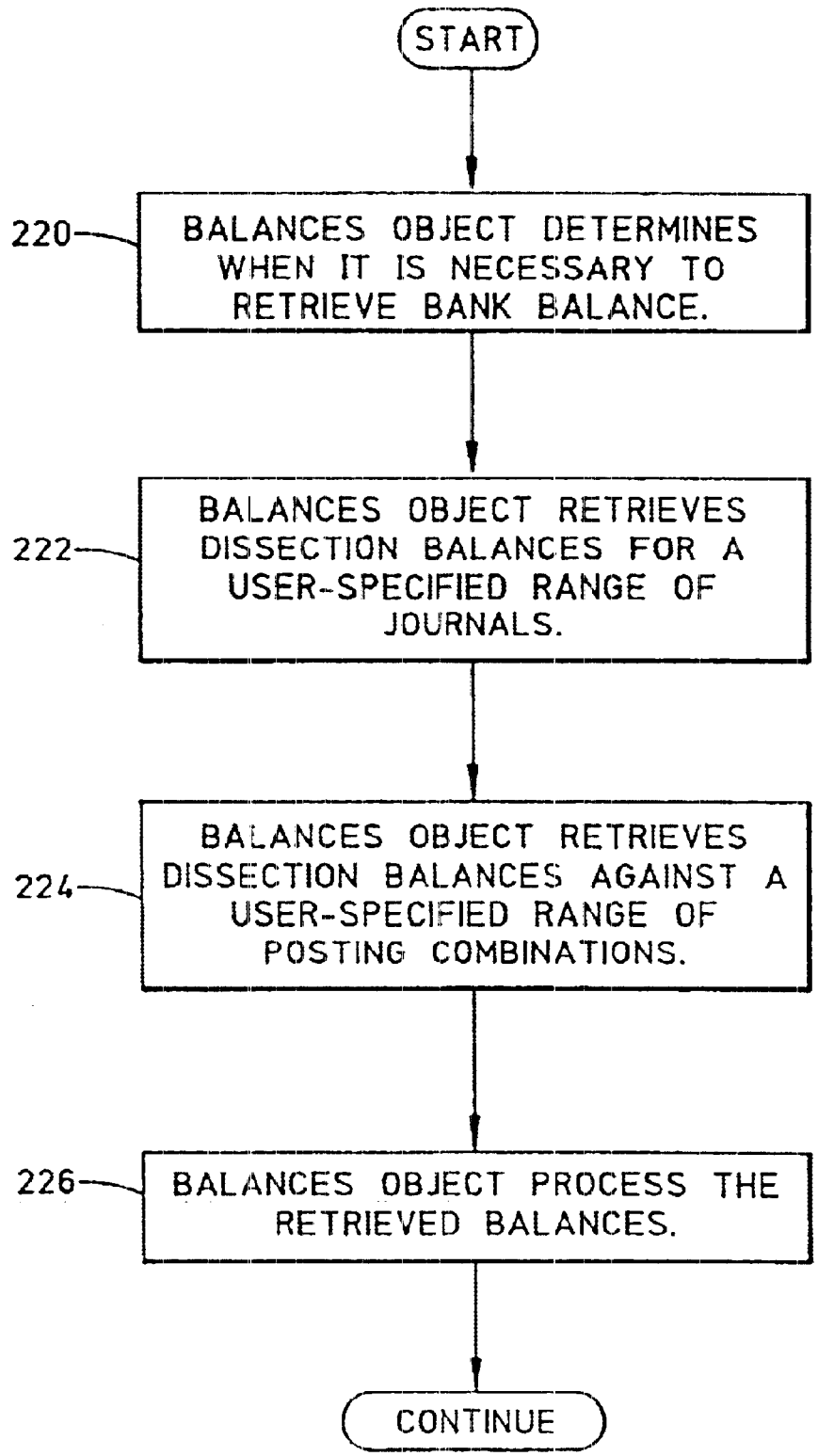
FIG. 19 is a flow diagram representation of the processing carried out by the Balances class illustrated in FIG. 11 and FIG. 16.

The balances processing begins in FIG. 19 with the flow diagram box numbered 220, which indicates that a Balances object determines when it is necessary to retrieve the balances for a General Ledger object. This determination is made in accordance with the attributes and methods of the Balances class as specified by the application program developer and the program user. The next step is to retrieve the dissection balances for the application user-specified range of journals. This step is represented by the flow diagram box numbered 222. Retrieval of balances processing also includes retrieval of dissection balances against an application user-specified range of posting combinations, processing represented by the flow diagram box numbered 224.

The final step of balances processing involves the formatting and presentation of results, steps that will be performed in accordance with the user interface specified by the application program developer. These processing steps are represented in the flow diagram box numbered 226. Program processing continues, as indicated by the continuation box in FIG. 19.

c. Creation of Bank Transactions.

Figure 20:
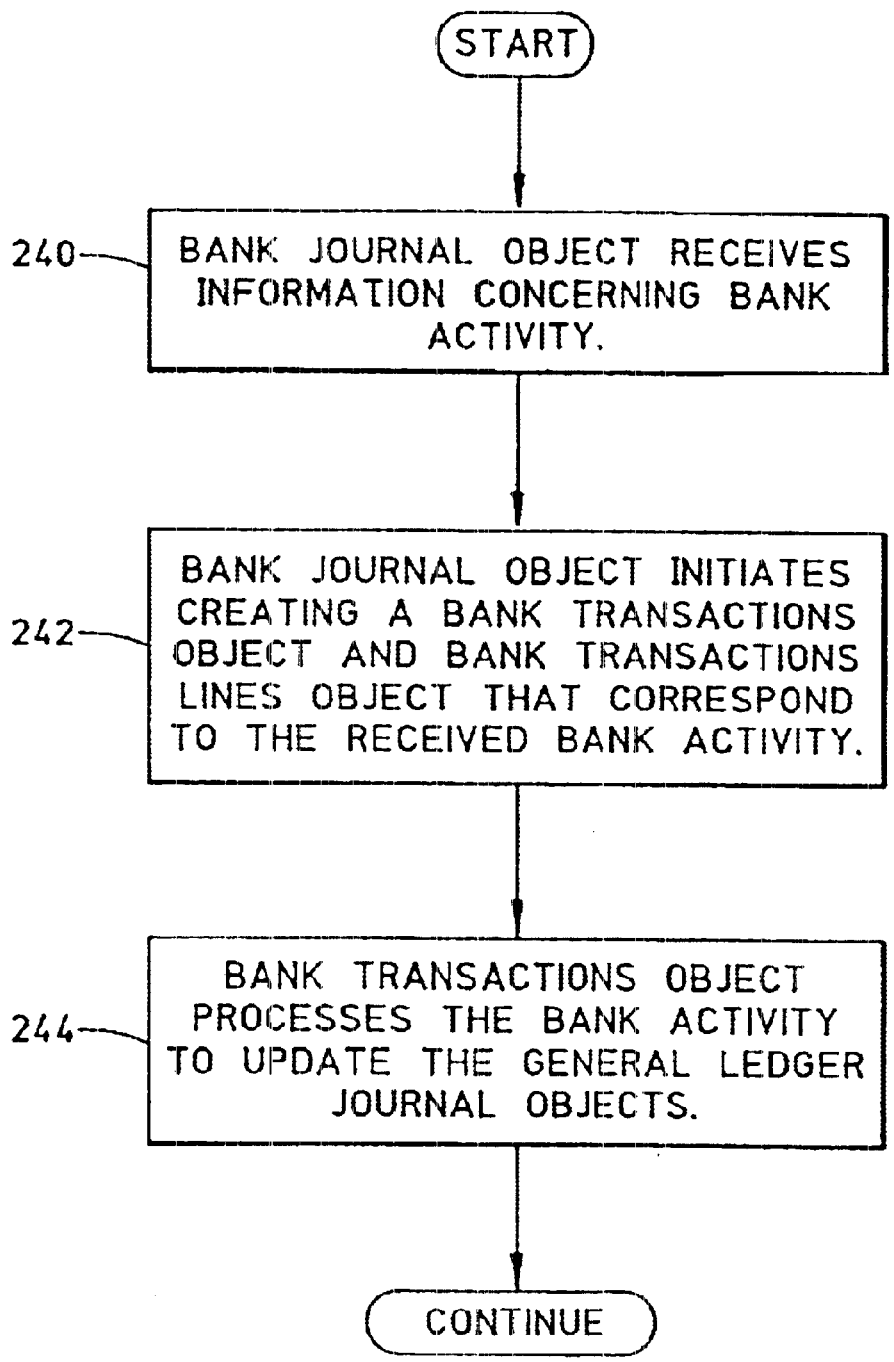
FIG. 20 is a flow diagram representation of the processing carried out by the GL Bank Accounts category illustrated in FIG. 13.

When Company bank transactions take place, such as deposits, withdrawals, and transfers of funds, the Bank Journal class is responsible for controlling creation of Bank Transactions and Bank Transaction Lines objects that update the Company bank accounts. The Bank Transactions class maintains the information in the General Ledger Journal objects that are needed to reconcile the ledger entries with periodic statements received from the Company's banks. The General Ledger Journal objects are created by the Create GLJ mechanism described above in connection with FIG. 18. The journals that update the bank posting combinations are created by the Bank Transactions class and the actual bank transactions and bank transaction lines for the general ledger are controlled and maintained by the Bank Journal class. The processing of the Bank Journal and Bank Transactions class members is illustrated by the flow diagram of FIG. 20.

The first processing step is to receive the information concerning bank activity for the Company, activity comprising a deposit, withdrawal, or transfer. This processing is represented by the flow diagram box numbered 240. The information is received by the Bank Journal object, which creates a Bank Transactions class member (object). As described above, the creation of an object is achieved through creator routines of the object oriented programming environment of the computer operating system illustrated in FIG. 2. The creation of the Bank Transactions object and corresponding Bank Transactions Lines object is represented by the flow diagram box numbered 242. After the Bank Transactions and Bank Transactions Lines objects are created, the Bank Transactions object processes the bank activity represented by the Bank Transactions Lines object to update the General Ledger, as represented by the flow diagram box numbered 244. Processing of the computer system then continues.

d. Revaluation.

The revaluation processing converts the current prime balances on a general ledger account to a base currency of the Company and writes off as currency gain or loss any variance from current base. This processing is especially important to companies that have operations in more than one country and therefore is part of the framework so program developers have this feature at their ready disposal. The processing for handling the revaluation of General Ledger accounts is controlled by the Revalue General Ledger control class objects. The processing of the Revalue General Ledger objects is represented by the flow diagram of FIG. 21.

Figure 21:
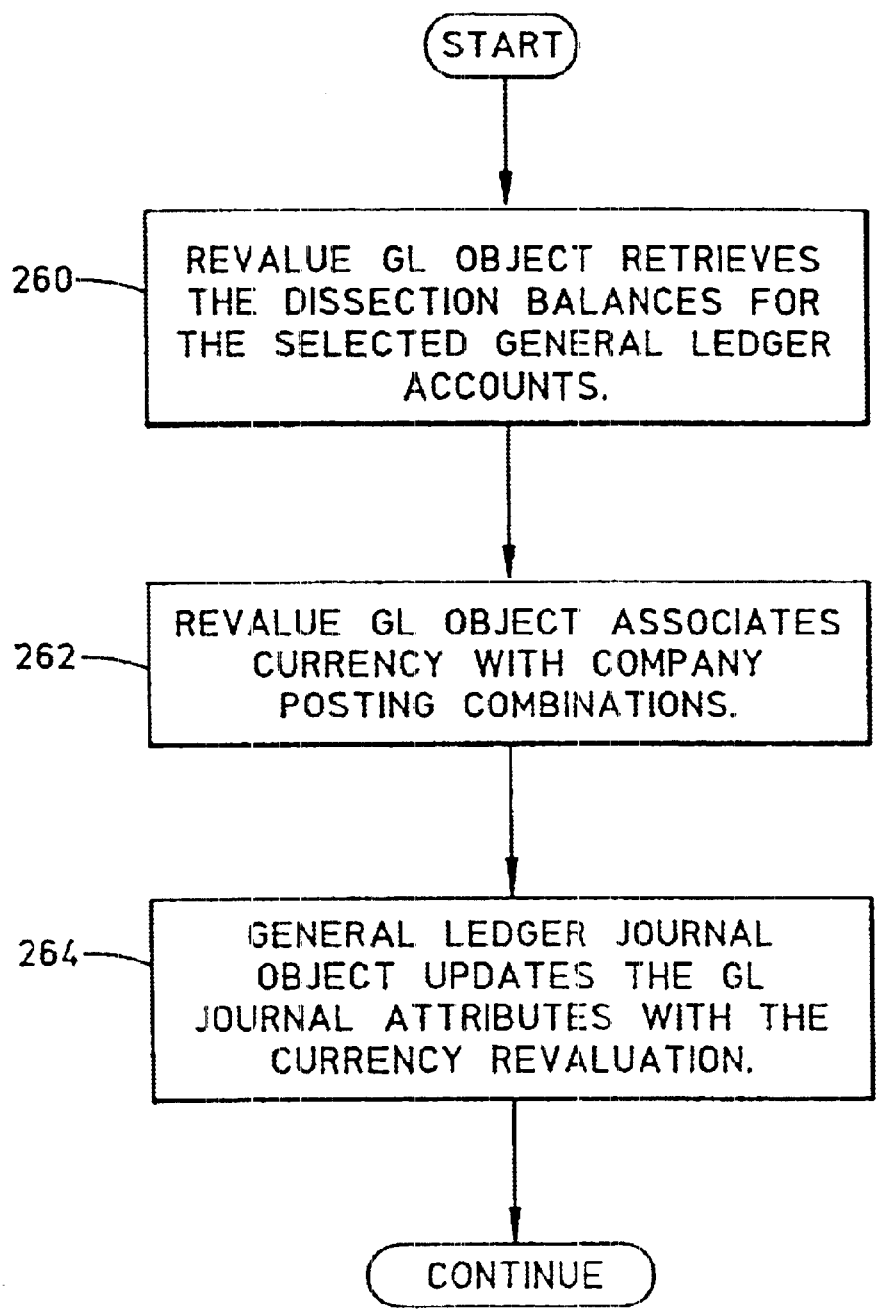
FIG. 21 is a flow diagram representation of the processing carried out by the GL Revaluation category illustrated in FIG. 16.

In the first step of processing, the a Revalue GL object retrieves the dissection balances for selected General Ledger accounts. There will be a Revalue GL object for each different currency in which the Company has operations. The Revalue GL object retrieves this information from the Balances class members. The processing of this first step is represented in FIG. 21 by the flow diagram box numbered 260.

The next step is for the Revalue GL object to associate one of the currencies in which the Company does business with the Posting Combinations used to record gains and losses due to currency revaluation. This step is represented by the FIG. 21 box numbered 262. The last step of revalue processing is for the General Ledger Journal object to receive the revalue information from the Revalue GL object and update the GL Journal with the currency revaluation. The processing of this step is represented by the FIG. 21 flow diagram box numbered 264. Processing of the computer system then continues.

e. General Ledger Close.

Another function performed by the general ledger framework of the present invention is to validate and close the current accounting period or accounting year and open the next accounting period or accounting year. This processing is controlled by the GL Close class and is represented by the flow diagram of FIG. 22.

Figure 22:
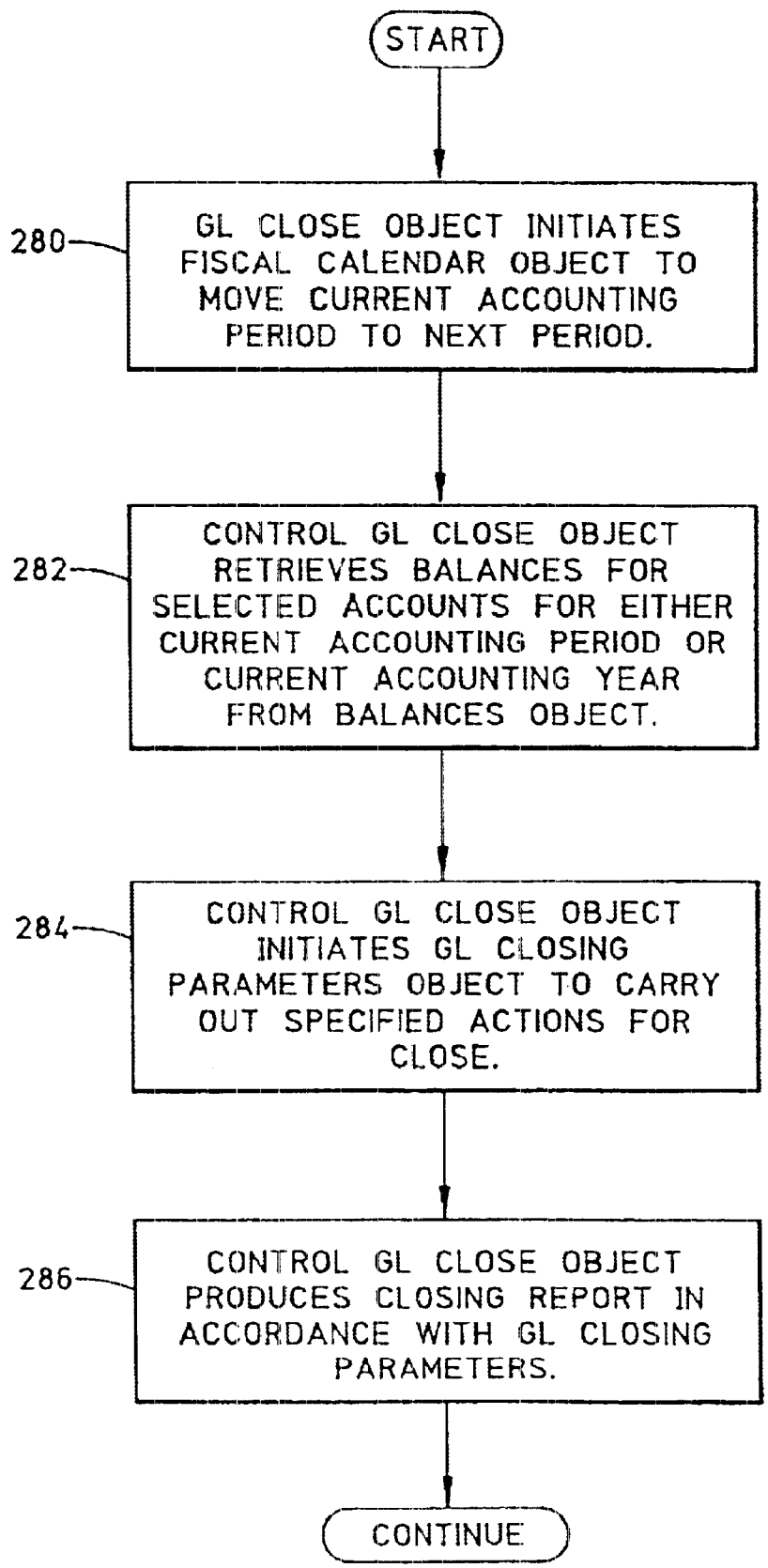
FIG. 22 is a flow diagram representation of the processing carried out by the GL Closing category illustrated in FIG. 17.

In the first processing step, the GL Close object invokes a method to move the current accounting period maintained by the Fiscal Calendar class to the next period. This is represented in FIG. 22 by the flow diagram box numbered 280. The next step is to retrieve the balances for user-selected accounts that are being closed for either the current accounting period or the current accounting year, as represented by the FIG. 22 flow diagram box numbered 282. Next, indicated by the flow diagram box numbered 284, the actions specified by the GL Closing Parameters class for the selected accounts are carried out under direction of the GL Close object. Finally, a closing report is produced for review by the user. This processing is initiated by the GL Close object but can be implemented in the manner specified by the user interface and the dictated by the framework developer selection, and is represented by the flow diagram box numbered 286. Processing of the computer system then continues.

ADVANTAGES OF THE INVENTION

Thus, the reusable framework of the invention provides a set of objects that perform general ledger functioning and permit a framework user to add extensions to the framework for specific processing features, thereby producing a general ledger application program for managing business financial data of a company. An application program developer can more quickly conclude program development and maintain programs with updates and improvements. The developer must provide the end-user interface, which establishes a means for the end-user to communicate with the application program to receive, process, and report data. The program developer is thereby free to concentrate on application program features, building upon the framework.

We claim:

1. A computer system comprising:
   a central processing unit;
   a user interface; and
   a main memory having an operating system that supports an object oriented programming environment containing an object oriented framework that provides an extensible business financial general ledger system, the object oriented framework comprising a set of object oriented classes including at least one user-extensible class that a user of the framework extends using object oriented principles of inheritance to define a business financial general ledger application, the main memory further including an Application category of cooperating objects that contain business financial data and the framework enables performing general ledged operations on the business financial data, wherein the Application category of cooperating objects includes a Chart of Account Attributes object class that specifies an analysis group, account types, and account attributes of the business financial data.

2. A computer system as defined in claim 1, wherein the general ledger Application category of cooperating objects includes a Create Journal object class that creates, processes, validates, and posts General Ledger Journal account attributes of the business financial data.

3. A computer system as defined in claim 2, wherein the Create Journal object class uses a Posting Combinations object class that assigns and validates combinations of the created General Ledger Journal accounts.

4. A computer system as defined in claim 3, further including a Closing category of cooperating objects that contain accounting period data and retrieve the General Ledger Journal account data and the account balances data and validate and close accounts in accordance with the accounting period end.

5. A computer system as defined in claim 2, wherein the General Ledger Journal object class references a Tax Item object class that associates General Ledger Journal account attributes with reportable tax information of the business financial data.

6. A computer system as defined in claim 1, wherein the general ledger Application category of cooperating objects includes a Dissection object class that spreads the impact of a General Ledger Journal account entry attribute across multiple accounts.

7. A computer system as defined in claim 6, further including a Revaluation category of cooperating objects that contain data defining a base currency and retrieve the Dissection account data such that the cooperating objects convert Dissection account data in one currency into the base currency and determine a variance due to currency exchange gain or loss.

8. An object oriented extensible business financial general ledger framework for use in a computer system having an operating system that supports an object oriented programming environment and includes a memory in which cooperating objects comprising object classes can be stored, the framework comprising a set of object oriented classes including at least one user-extensible class that a user of the framework extends using object oriented principles of inheritance to define a business financial general ledger application, the framework comprising an Application category of cooperating objects that contain business financial data and perform general ledger operations on the business financial data, wherein the Application category of cooperating objects further includes a Chart of Account Attributes object class that specifies an analysis group, account types, and account attributes of the Application category business financial data.

9. A framework as defined in claim 8, wherein the Application category of cooperating objects includes a Create Journal object class that creates, processes, validates, and posts General Ledger Journal account attributes of the business financial data.

10. A framework as defined in claim 9, wherein the Create Journal object class uses a Posting Combinations object class that assigns and validates combinations of the created General Ledger Journal accounts.

11. A framework as defined in claim 9, further including a Closing category of cooperating objects that contain accounting period data and retrieve the General Ledger Journal account data and the account balances data and validate and close accounts in accordance with the accounting period end.

12. A framework as defined in claim 8, wherein the General Ledger Journal object class references a Tax Item object class that associates General Ledger Journal account attributes with reportable tax information of the business financial data.

13. A framework as defined in claim 8, wherein the Application category of cooperating objects includes a Dissection object class that spreads the impact of a General Ledger Journal account entry attribute across multiple accounts.

14. A framework as defined in claim 13, further including a Revaluation category of cooperating objects that contain base currency data and retrieve the Dissection account data such that the cooperating objects convert Dissection account data in one currency into the base currency and determine a variance due to currency exchange gain or loss.

15. A program product storage device, tangibly embodying a program of machine-readable instructions executable by a computer system having an operating system that supports an object oriented programming environment, the program product comprising:
   a recordable media; and
   an object oriented framework recorded on the recordable media, the framework comprising a set of object oriented classes including at least one user-extensible class that a user of the framework extends using object oriented principles of inheritance to define a business financial general ledger application, the framework having an Application category of cooperating objects that contain business financial data and perform general ledger operations on the business financial data, wherein the Application category of cooperating objects includes a Chart of Account Attributes object class that specifies an analysis group, account types, and account attributes of the Application category business financial data.

16. A program product as defined in claim 15, wherein the Application category of cooperating objects includes a Create Journal object class that creates, processes, validates, and posts General Ledger Journal account attributes of the business financial data.

17. A program product as defined in claim 16, wherein the Create Journal object class uses a Posting Combinations object class that assigns and validates combinations of the created General Ledger Journal accounts.

18. A program product as defined in claim 15, further including a Closing category of cooperating objects that contain accounting period data and retrieve the General Ledger Journal account data and the account balances data and validate and close accounts in accordance with the accounting period end.

19. A program product as defined in claim 15, wherein the General Ledger Journal object class references a Tax Item object class that associates General Ledger Journal account attributes with reportable tax information of the business financial data.

20. A program product as defined in claim 15, wherein the Application category of cooperating objects includes a Dissection object class that spreads the impact of a General Ledger Journal account entry attribute across multiple accounts.

21. A program product as defined in claim 20, further including a Revaluation category of cooperating objects that contain base currency data and retrieve the Dissection account data such that the cooperating objects convert Dissection account data in one currency into the base currency and determine a variance due to currency exchange gain or loss.

22. A method of distributing a program product, the method comprising the steps of:
    establishing a connection between a first computer system and a second computer system; and
    transmitting the program product from the first computer system to the second computer system, wherein the program product comprises an object oriented framework, the object oriented framework comprising a set of object oriented classes including at least one user-extensible class that a user of the framework extends using object oriented principles of inheritance to define a business financial general ledger application, the framework having an Application category of cooperating objects that contain business financial data and perform general ledger operations on the business financial data, wherein the Application category of cooperating objects includes a Chart of Account Attributes object class that specifies an analysis group, account types, and account attributes of the Application category business financial data.

23. A method of distributing a program product as defined in claim 22, wherein the Application category of cooperating objects includes a Create Journal object class that creates, processes, validates, and posts General Ledger Journal account attributes of the business financial data.

24. A method of distributing a program product as defined in claim 23, wherein the Create Journal object class uses a Posting Combinations object class that assigns and validates combinations of the created General Ledger Journal accounts.

25. A method of distributing a program product as defined in claim 22, further including a Closing category of cooperating objects that contain accounting period data and retrieve the General Ledger Journal account data and the account balances data and validate and close accounts in accordance with the accounting period end.

26. A method of distributing a program product as defined in claim 22, wherein the General Ledger Journal object class references a Tax Item object class that associates General Ledger Journal account attributes with reportable tax information of the business financial data.

27. A method of distributing a program product as defined in claim 22, wherein the Application category of cooperating objects includes a Dissection object class that spreads the impact of a General Ledger Journal account entry attribute across multiple accounts.

28. A method of distributing a program product as defined in claim 27, further including a Revaluation category of cooperating objects that contain base currency data and retrieve the Dissection account data such that the cooperating objects convert Dissection account data in one currency into the base currency and determine a variance due to currency exchange gain or loss.

29. A method of executing a software build process in a computer system having a central processing unit that controls processing in the computer system, a user interface, and a main memory having an operating system that supports an object oriented programming environment, the method comprising the steps of:
    providing an object oriented framework, the object oriented framework comprising a set of object oriented classes including at least one user-extensible class that a user of the framework extends using object oriented principles of inheritance to define a business financial general ledger application, the object oriented framework having an Application category of cooperating objects that contain business financial data and perform general ledger operations on the business financial data, wherein the Application category of cooperating objects includes a Chart of Account Attributes object class that specifies an analysis group, account types, and account attributes of the Application category business financial data; and
    extending the framework using object oriented principles of inheritance and producing an application program.

30. A method as defined in claim 29, wherein the Application category of cooperating objects includes a Create Journal object class that creates, processes, validates, and posts General Ledger Journal account attributes of the business financial data.

31. A method as defined in claim 30, wherein the Create Journal object class uses a Posting Combinations object class that assigns and validates combinations of the created General Ledger Journal accounts.

32. A method as defined in claim 30, further including a Closing category of cooperating objects that contain accounting period data and retrieve the General Ledger Journal account data and the account balances data and validate and close accounts in accordance with the accounting period end.

33. A method as defined in claim 29, wherein the General Ledger Journal object class references a Tax Item object class that associates General Ledger Journal account attributes with reportable tax information of the business financial data.

34. A method as defined in claim 29, wherein the Application category of cooperating objects includes a Dissection object class that spreads the impact of a General Ledger Journal account entry attribute across multiple accounts.

35. A method as defined in claim 34, further including a Revaluation category of cooperating objects that contain base currency data and retrieve the Dissection account data such that the cooperating objects convert Dissection account data in one currency into the base currency and determine a variance due to currency exchange gain or loss.

* * * * *